(12) United States Patent
Thompson

(10) Patent No.: US 10,953,696 B2
(45) Date of Patent: Mar. 23, 2021

(54) NON-PNEUMATIC TIRE AND OTHER ANNULAR DEVICES

(71) Applicant: CAMSO INC., Magog (CA)

(72) Inventor: Ronald H. Thompson, Greenville, SC (US)

(73) Assignee: CAMSO INC, Magog (CA)

(*) Notice: Subject to any disclaimer, the term of this patent is extended or adjusted under 35 U.S.C. 154(b) by 633 days.

(21) Appl. No.: 15/549,024

(22) PCT Filed: Feb. 4, 2016

(86) PCT No.: PCT/US2016/016630
§ 371 (c)(1),
(2) Date: Aug. 4, 2017

(87) PCT Pub. No.: WO2016/126983
PCT Pub. Date: Aug. 11, 2016

(65) Prior Publication Data
US 2018/0029422 A1    Feb. 1, 2018

Related U.S. Application Data

(60) Provisional application No. 62/111,872, filed on Feb. 4, 2015.

(51) Int. Cl.
*B60C 7/00*    (2006.01)
*B60C 7/10*    (2006.01)
(Continued)

(52) U.S. Cl.
CPC ............ *B60C 11/0041* (2013.01); *B60C 7/10* (2013.01); *B60C 7/18* (2013.01); *B60C 9/18* (2013.01);
(Continued)

(58) Field of Classification Search
CPC .. B60C 7/00; B60C 7/10; B60C 7/102; B60C 7/22
See application file for complete search history.

(56) References Cited

U.S. PATENT DOCUMENTS

| | | | |
|---|---|---|---|
| 2,704,102 A | 3/1955 | Starr et al. | |
| 3,494,402 A | 2/1970 | Goldberger | |

(Continued)

FOREIGN PATENT DOCUMENTS

| | | | |
|---|---|---|---|
| CA | 2458002 C | 8/2010 | |
| CA | 2651523 C | 2/2012 | |

(Continued)

OTHER PUBLICATIONS https://en.wikipedia.org/wiki/Shear_modulus, no date.*
(Continued)

*Primary Examiner* — Justin R Fischer
(74) *Attorney, Agent, or Firm* — Oliff PLC; R. Brian Drozd

(57) ABSTRACT

A non-pneumatic tire for a vehicle or other machine. The non-pneumatic tire may include an annular beam. The annular beam may include a plurality of layers of different elastomeric materials. The annular beam may be free of a substantially inextensible reinforcing layer running in a circumferential direction of the non-pneumatic tire. The annular beam may include a plurality of openings distributed in the circumferential direction of the non-pneumatic tire. Such an annular beam may be part of other annular devices.

25 Claims, 18 Drawing Sheets

(51) Int. Cl.
  *B60C 11/00* (2006.01)
  *B60C 11/03* (2006.01)
  *B60C 9/18* (2006.01)
  *B60C 7/18* (2006.01)
  *B60C 7/14* (2006.01)

(52) U.S. Cl.
  CPC ........ *B60C 9/1807* (2013.01); *B60C 11/0311* (2013.01); *B60C 2007/146* (2013.01); *B60C 2011/0025* (2013.01); *B60C 2011/0388* (2013.01)

(56) References Cited

U.S. PATENT DOCUMENTS

| | | | |
|---|---|---|---|
| 3,804,144 A | 4/1974 | Sand, Sr. | |
| 3,814,158 A | 6/1974 | Ryder | |
| 3,827,792 A | 8/1974 | Hollins | |
| 3,901,300 A | 8/1975 | Toplis | |
| 3,907,370 A | 9/1975 | Bard | |
| 3,957,101 A | 5/1976 | Ippen et al. | |
| 4,044,811 A * | 8/1977 | Dudek | B29D 30/0679 152/452 |
| 4,164,251 A | 8/1979 | Chung | |
| 4,169,494 A | 10/1979 | Kubica et al. | |
| 4,201,744 A | 5/1980 | Makinson | |
| 4,226,273 A | 10/1980 | Long et al. | |
| 4,235,270 A | 11/1980 | Kahaner et al. | |
| 4,244,413 A | 1/1981 | Takahashi et al. | |
| 4,253,893 A | 3/1981 | Clinefelter | |
| 4,262,724 A | 4/1981 | Sarkissian | |
| 4,273,176 A | 6/1981 | Wyman et al. | |
| 4,281,700 A | 8/1981 | Ross | |
| 4,287,927 A | 9/1981 | Caravito et al. | |
| 4,310,042 A | 1/1982 | Wyman et al. | |
| 4,345,633 A | 8/1982 | Gilmore | |
| 4,350,196 A | 9/1982 | Hampshire | |
| 4,387,071 A | 6/1983 | Kirkhuff | |
| 4,446,903 A | 5/1984 | Clinefelter et al. | |
| 4,471,827 A | 7/1984 | Czapar | |
| 4,558,727 A | 12/1985 | Golata et al. | |
| 4,580,610 A | 4/1986 | Jackson | |
| 4,705,087 A | 11/1987 | Markow | |
| 4,739,810 A | 4/1988 | Markow | |
| 4,773,461 A | 9/1988 | Landers et al. | |
| 4,784,201 A | 11/1988 | Palinkas et al. | |
| 4,832,098 A | 5/1989 | Palinkas et al. | |
| 4,867,217 A | 9/1989 | Laurent | |
| 4,917,162 A | 4/1990 | De Longcamp | |
| 4,921,029 A | 5/1990 | Palinkas et al. | |
| 4,934,425 A | 6/1990 | Gajewski et al. | |
| 4,945,962 A | 8/1990 | Pajtas | |
| 4,966,212 A | 10/1990 | Hill | |
| 5,023,040 A | 6/1991 | Gajewski et al. | |
| 5,024,028 A | 6/1991 | Pierce et al. | |
| 5,042,544 A | 8/1991 | Dehasse | |
| 5,050,656 A | 9/1991 | Ho | |
| 5,086,815 A | 2/1992 | Panaroni et al. | |
| 5,090,464 A | 2/1992 | Kauzlarich et al. | |
| 5,139,066 A | 8/1992 | Jarman | |
| 5,168,910 A | 12/1992 | Zhang et al. | |
| 5,174,634 A | 12/1992 | Blanck et al. | |
| 5,223,599 A | 6/1993 | Gajewski | |
| 5,236,027 A | 8/1993 | Lu | |
| 5,265,659 A | 11/1993 | Pajtas et al. | |
| 5,313,994 A | 5/1994 | Hill, III et al. | |
| 5,343,916 A | 9/1994 | Duddey et al. | |
| 5,353,853 A | 10/1994 | Hansson | |
| 5,460,213 A | 10/1995 | Pajtas | |
| 5,494,090 A | 2/1996 | Kejha | |
| 5,520,232 A | 5/1996 | Fukutake et al. | |
| 5,676,900 A | 10/1997 | Pajtas | |
| 5,743,316 A | 4/1998 | Chrobak | |
| 5,879,482 A | 3/1999 | Rooney et al. | |
| 6,068,353 A | 5/2000 | Juncker et al. | |
| 6,095,216 A | 8/2000 | Cenni et al. | |
| 6,167,931 B1 | 1/2001 | Hsiao | |
| 6,170,544 B1 | 1/2001 | Hottebart | |
| 6,279,630 B1 | 8/2001 | Herbert Ims | |
| 6,298,891 B1 | 10/2001 | Harris | |
| 6,364,424 B1 | 1/2002 | Lashlee et al. | |
| 6,431,235 B1 | 8/2002 | Steinke | |
| 6,450,222 B1 | 9/2002 | Fleming | |
| 6,530,404 B1 | 3/2003 | Rooney | |
| 6,615,885 B1 | 9/2003 | Ohm | |
| 6,617,383 B2 | 9/2003 | Ikawa et al. | |
| 6,640,859 B1 | 11/2003 | Laurent et al. | |
| 6,640,861 B2 | 11/2003 | Pereira et al. | |
| 6,681,822 B2 | 1/2004 | Adams et al. | |
| 6,698,480 B1 | 3/2004 | Cornellier | |
| 6,767,495 B2 | 7/2004 | Aperce et al. | |
| 6,769,465 B2 | 8/2004 | Rhyne et al. | |
| 6,769,746 B2 | 8/2004 | Rodgers et al. | |
| 6,820,942 B1 | 11/2004 | Knack | |
| 6,983,776 B2 | 1/2006 | Thompson et al. | |
| 6,994,134 B2 | 2/2006 | Grah | |
| 6,994,135 B2 | 2/2006 | Delfino et al. | |
| 7,013,939 B2 | 3/2006 | Rhyne et al. | |
| 7,032,634 B2 | 4/2006 | Laurent et al. | |
| 7,032,637 B2 | 4/2006 | Meraldi | |
| 7,044,180 B2 | 5/2006 | Rhyne et al. | |
| 7,066,225 B2 | 6/2006 | Rhyne et al. | |
| 7,128,479 B2 | 10/2006 | Veas | |
| 7,128,794 B2 | 10/2006 | Veas | |
| 7,159,632 B2 | 1/2007 | Fukui | |
| 7,201,194 B2 | 4/2007 | Rhyne et al. | |
| 7,231,948 B2 | 6/2007 | Forney, III et al. | |
| 7,281,558 B2 | 10/2007 | Merino Lopez | |
| 7,329,325 B2 | 2/2008 | Prost | |
| 7,418,988 B2 | 9/2008 | Cron et al. | |
| 7,473,472 B2 | 1/2009 | Chenaux et al. | |
| 7,506,878 B2 | 3/2009 | Feick | |
| 7,546,862 B2 | 6/2009 | Moon et al. | |
| 7,604,029 B2 | 10/2009 | Myatt | |
| 7,650,919 B2 | 1/2010 | Rhyne et al. | |
| 7,743,806 B2 | 6/2010 | Abe | |
| 7,832,263 B2 | 11/2010 | Rensel et al. | |
| 7,950,428 B2 | 5/2011 | Hanada et al. | |
| 7,950,429 B2 | 5/2011 | Re Fiorentin et al. | |
| 8,056,593 B2 | 11/2011 | Palinkas et al. | |
| 8,061,398 B2 | 11/2011 | Palinkas et al. | |
| 8,091,596 B2 | 1/2012 | Louden | |
| 8,104,524 B2 | 1/2012 | Manesh et al. | |
| 8,109,308 B2 | 2/2012 | Manesh et al. | |
| 8,113,253 B2 | 2/2012 | Arakawa et al. | |
| 8,141,606 B2 | 3/2012 | Benzing, II et al. | |
| 8,166,809 B2 | 5/2012 | Weston | |
| 8,176,957 B2 | 5/2012 | Manesh et al. | |
| 8,215,351 B2 | 5/2012 | Thompson | |
| 8,276,628 B2 | 10/2012 | Hanada et al. | |
| 8,277,590 B2 | 10/2012 | Delfino et al. | |
| 8,419,408 B2 | 4/2013 | Wang | |
| 8,476,808 B2 | 7/2013 | Weston et al. | |
| 8,491,981 B2 | 7/2013 | Delfino et al. | |
| 8,517,068 B2 | 8/2013 | Delfino et al. | |
| 8,544,515 B2 | 10/2013 | Ma et al. | |
| 8,555,941 B2 | 10/2013 | Chadwick et al. | |
| 8,567,461 B2 | 10/2013 | Williams et al. | |
| 8,578,607 B2 | 11/2013 | Kim | |
| 8,585,947 B2 | 11/2013 | Meraldi et al. | |
| 8,609,220 B2 | 12/2013 | Summers et al. | |
| 8,623,169 B2 | 1/2014 | Delfino et al. | |
| 8,631,844 B2 | 1/2014 | Anderfaas et al. | |
| 8,636,490 B1 | 1/2014 | Martin et al. | |
| 8,646,497 B2 | 2/2014 | Cron | |
| 8,651,156 B2 | 2/2014 | Fadel et al. | |
| 8,662,122 B2 | 3/2014 | Benzing, II | |
| 8,672,006 B2 | 3/2014 | Moon | |
| 8,688,421 B2 | 4/2014 | Summers et al. | |
| 8,714,217 B2 | 5/2014 | Chon et al. | |
| 8,720,504 B2 | 5/2014 | Benzing, II et al. | |
| 8,720,505 B2 | 5/2014 | Fiorentin et al. | |
| 8,742,265 B2 | 6/2014 | Weston et al. | |
| 8,746,302 B2 | 6/2014 | Sachdev et al. | |
| 8,751,270 B1 | 6/2014 | Hanson et al. | |

(56) References Cited

U.S. PATENT DOCUMENTS

| | | |
|---|---|---|
| 8,783,310 B2 | 7/2014 | Abe |
| D711,815 S | 8/2014 | Abe et al. |
| 8,813,797 B2 | 8/2014 | Anderson et al. |
| 8,827,383 B2 | 9/2014 | Simula |
| 8,851,131 B2 | 10/2014 | Luchini et al. |
| 8,863,798 B2 | 10/2014 | Re Fiorentin et al. |
| 8,883,283 B2 | 11/2014 | Delfino et al. |
| 8,919,404 B2 | 12/2014 | Schweitzer et al. |
| 8,931,531 B2 | 1/2015 | Kubeck et al. |
| 8,950,451 B2 | 2/2015 | Abe |
| 8,960,248 B2 | 2/2015 | Cron et al. |
| 8,962,120 B2 | 2/2015 | Delfino et al. |
| 8,944,125 B2 | 3/2015 | Manesh et al. |
| 8,978,723 B2 | 3/2015 | McCulley |
| 8,991,455 B2 | 3/2015 | Cron |
| 8,999,480 B2 | 4/2015 | Summers et al. |
| 9,004,127 B2 | 4/2015 | Manesh et al. |
| 9,004,901 B2 | 4/2015 | Wilson |
| 9,016,336 B2 | 4/2015 | Benzing, II et al. |
| 9,027,615 B2 | 5/2015 | Dermience et al. |
| D731,958 S | 6/2015 | Kiwaki |
| 9,090,121 B2 | 7/2015 | Korus et al. |
| 9,108,470 B2 | 8/2015 | Tercha et al. |
| 9,120,351 B2 | 9/2015 | Mun et al. |
| 9,139,045 B2 | 9/2015 | Palinkas et al. |
| 9,144,946 B2 | 9/2015 | Creasap et al. |
| 9,149,994 B2 | 10/2015 | Martin et al. |
| 9,156,313 B2 | 10/2015 | Thompson |
| 9,162,407 B2 | 10/2015 | Martin et al. |
| 9,180,732 B2 | 11/2015 | Endicott |
| 9,180,737 B2 | 11/2015 | Amstutz et al. |
| 9,186,934 B2 | 11/2015 | Korus |
| 9,205,706 B2 | 12/2015 | Kline et al. |
| 9,242,509 B2 | 1/2016 | Chang |
| 9,242,510 B2 | 1/2016 | Korus |
| 9,248,697 B2 | 2/2016 | Iwamura |
| 9,254,716 B2 | 2/2016 | Cron et al. |
| 9,266,388 B2 | 2/2016 | Schaedler et al. |
| 9,266,506 B2 | 2/2016 | Korus et al. |
| 9,272,576 B2 | 3/2016 | Dotson et al. |
| 9,278,494 B2 | 3/2016 | Anderson et al. |
| 9,283,806 B2 | 3/2016 | Korus et al. |
| 9,283,810 B2 | 3/2016 | Korus et al. |
| 9,283,811 B2 | 3/2016 | Kim |
| 9,290,045 B2 | 3/2016 | Cron |
| 9,290,053 B2 | 3/2016 | Choi et al. |
| 9,290,054 B2 | 3/2016 | Pfrenger et al. |
| 9,290,059 B2 | 3/2016 | Fredenburg et al. |
| 9,302,539 B2 | 4/2016 | Korus et al. |
| 9,321,312 B2 | 4/2016 | Asper |
| 9,333,799 B2 | 5/2016 | Choi et al. |
| 9,346,317 B2 | 5/2016 | Dotson et al. |
| 9,346,499 B2 | 5/2016 | Rudakevych et al. |
| 9,352,617 B2 | 5/2016 | Zhang |
| 9,358,704 B2 | 6/2016 | Kagota et al. |
| 9,381,773 B2 | 7/2016 | Seljan |
| 9,387,637 B2 | 7/2016 | Martin et al. |
| 9,387,726 B2 | 7/2016 | Choi et al. |
| 9,393,835 B2 | 7/2016 | Dotson et al. |
| D763,785 S | 8/2016 | Abe et al. |
| 9,421,820 B2 | 8/2016 | Wilson et al. |
| 9,440,404 B2 | 9/2016 | Martin |
| 9,440,494 B2 | 9/2016 | Asper |
| 9,463,603 B2 | 10/2016 | Chadwick et al. |
| 9,463,668 B2 | 10/2016 | Fredenburg et al. |
| 9,475,244 B2 | 10/2016 | Williams et al. |
| 9,475,379 B2 | 10/2016 | Imamiya et al. |
| 9,481,208 B2 | 11/2016 | Matsuda et al. |
| 9,487,046 B2 | 11/2016 | Amstutz et al. |
| 9,487,052 B1 | 11/2016 | Asper |
| 9,487,892 B2 | 11/2016 | Abad |
| 9,493,045 B2 | 11/2016 | Cron et al. |
| 9,511,625 B2 | 12/2016 | Nishida et al. |
| 9,511,631 B2 | 12/2016 | Fudemoto et al. |
| 9,511,632 B2 | 12/2016 | Fudemoto et al. |
| 9,550,393 B2 | 1/2017 | Abe et al. |
| 9,573,422 B2 | 2/2017 | Gass et al. |
| 9,573,622 B2 | 2/2017 | Fujita et al. |
| 9,604,497 B2 | 3/2017 | Korus et al. |
| 9,616,703 B2 | 4/2017 | Nishida et al. |
| 9,616,713 B2 | 4/2017 | Lettieri et al. |
| 9,623,702 B2 | 4/2017 | Fudemoto et al. |
| 9,643,453 B2 | 5/2017 | Dotson et al. |
| 9,662,936 B2 | 5/2017 | Slanker et al. |
| 9,662,939 B2 | 5/2017 | Manesh et al. |
| 9,713,940 B2 | 7/2017 | Nishida et al. |
| 9,718,306 B2 | 8/2017 | Korus et al. |
| 9,731,556 B2 | 8/2017 | Martin et al. |
| 9,751,270 B2 | 9/2017 | Thompson |
| 9,758,002 B2 | 9/2017 | Carter et al. |
| 9,776,454 B2 | 10/2017 | Chen |
| 9,821,601 B2 | 11/2017 | Korus et al. |
| 9,834,040 B2 | 12/2017 | Benzing, II et al. |
| 9,939,835 B2 | 4/2018 | Watanabe |
| 10,166,732 B2 | 1/2019 | Thompson |
| 2003/0201043 A1 | 10/2003 | Adams et al. |
| 2004/0007300 A1 | 1/2004 | Foucher |
| 2004/0012246 A1 | 1/2004 | Rhyne et al. |
| 2004/0112491 A1 | 6/2004 | Grah |
| 2006/0005903 A1 | 1/2006 | Fry et al. |
| 2006/0040077 A1 | 2/2006 | Wilson et al. |
| 2006/0060280 A1 | 3/2006 | Ladouce et al. |
| 2006/0102264 A1 | 5/2006 | Nicolas |
| 2006/0113016 A1 | 6/2006 | Cron et al. |
| 2006/0169797 A1 | 8/2006 | Kaltenheuser |
| 2006/0201597 A1 | 9/2006 | Lacour |
| 2006/0249235 A1 | 11/2006 | Lacour |
| 2007/0119531 A1 | 5/2007 | Steinke et al. |
| 2007/0200265 A1 | 8/2007 | Forney, III et al. |
| 2007/0267116 A1 | 11/2007 | Rhyne et al. |
| 2008/0029215 A1 | 2/2008 | Delfino et al. |
| 2008/0257463 A1 | 10/2008 | Re Fiorentin et al. |
| 2009/0107596 A1 | 4/2009 | Palinkas et al. |
| 2009/0183810 A1 | 7/2009 | Vannan et al. |
| 2009/0211677 A1 | 8/2009 | Palinkas et al. |
| 2009/0211681 A1 | 8/2009 | Palinkas et al. |
| 2009/0250149 A1 | 10/2009 | Sebe |
| 2009/0294000 A1 | 12/2009 | Cron |
| 2009/0301625 A1 | 12/2009 | Moon et al. |
| 2010/0071819 A1 | 3/2010 | McCulley |
| 2010/0078111 A1 | 4/2010 | Anderson et al. |
| 2010/0132858 A1 | 6/2010 | Arakawa et al. |
| 2010/0132865 A1 | 6/2010 | Iwase et al. |
| 2010/0154948 A1 | 6/2010 | Dahlberg et al. |
| 2010/0193097 A1 | 8/2010 | McNier et al. |
| 2010/0200131 A1 | 8/2010 | Iwase et al. |
| 2011/0017377 A1 | 1/2011 | Albert et al. |
| 2011/0079336 A1 | 4/2011 | Thenault et al. |
| 2011/0104428 A1 | 5/2011 | Delfino et al. |
| 2011/0146872 A1 | 6/2011 | Tercha et al. |
| 2011/0180194 A1 | 7/2011 | Anderson et al. |
| 2011/0240193 A1 | 10/2011 | Matsuda et al. |
| 2011/0253281 A1 | 10/2011 | Christenbury |
| 2011/0265926 A1 | 11/2011 | De Staercke |
| 2011/0278911 A1 | 11/2011 | Funaki |
| 2012/0038206 A1 | 2/2012 | Chadwick et al. |
| 2012/0038207 A1 | 2/2012 | Williams et al. |
| 2012/0193004 A1 | 8/2012 | Anderson et al. |
| 2012/0216932 A1 | 8/2012 | Cron et al. |
| 2012/0234444 A1 | 9/2012 | Palinkas et al. |
| 2012/0234445 A1 | 9/2012 | Manesh et al. |
| 2012/0241531 A1 | 9/2012 | Werner |
| 2012/0247635 A1 | 10/2012 | Manesh et al. |
| 2012/0318421 A1 | 12/2012 | Matsuda et al. |
| 2013/0048171 A1 | 2/2013 | Sandstrom et al. |
| 2013/0048174 A1 | 2/2013 | Cron |
| 2013/0150516 A1 | 6/2013 | Lettow |
| 2013/0167990 A1 | 7/2013 | Bae |
| 2013/0233458 A1 | 9/2013 | Meraldi et al. |
| 2013/0240097 A1 | 9/2013 | Cron et al. |
| 2013/0248067 A1 | 9/2013 | Delfino et al. |
| 2013/0276968 A1 | 10/2013 | Moore |
| 2013/0278045 A1 | 10/2013 | Dotson |
| 2013/0284329 A1 | 10/2013 | Wilson et al. |

(56) References Cited

U.S. PATENT DOCUMENTS

| | | |
|---|---|---|
| 2013/0340902 A1 | 12/2013 | Kemeny |
| 2014/0062168 A1 | 3/2014 | Martin et al. |
| 2014/0062169 A1 | 3/2014 | Martin et al. |
| 2014/0062170 A1 | 3/2014 | Martin et al. |
| 2014/0062171 A1 | 3/2014 | Martin et al. |
| 2014/0062172 A1 | 3/2014 | Martin et al. |
| 2014/0070460 A1 | 3/2014 | Martin et al. |
| 2014/0083581 A1 | 3/2014 | Schaedler et al. |
| 2014/0110028 A1 | 4/2014 | Benzing, II |
| 2014/0159280 A1 | 6/2014 | Martin et al. |
| 2014/0191564 A1 | 7/2014 | Gebeau |
| 2014/0191565 A1 | 7/2014 | Gebeau |
| 2014/0205836 A1 | 7/2014 | Hidrot et al. |
| 2014/0238561 A1 | 8/2014 | Choi et al. |
| 2014/0246135 A1 | 9/2014 | Andrews |
| 2014/0251518 A1 | 9/2014 | Abe et al. |
| 2014/0326374 A1 | 11/2014 | Cron et al. |
| 2014/0367007 A1 | 12/2014 | Thompson |
| 2015/0007926 A1 | 1/2015 | Sandstrom et al. |
| 2015/0013871 A1 | 1/2015 | McEwen et al. |
| 2015/0034222 A1 | 2/2015 | Martin et al. |
| 2015/0034225 A1 | 2/2015 | Martin |
| 2015/0048547 A1 | 2/2015 | Benzing, II |
| 2015/0083296 A1 | 3/2015 | Asper |
| 2015/0096654 A1 | 4/2015 | Sandstrom et al. |
| 2015/0122385 A1 | 5/2015 | Cron et al. |
| 2015/0158337 A1 | 6/2015 | Korus et al. |
| 2015/0174953 A1 | 6/2015 | Cron et al. |
| 2015/0191157 A1 | 7/2015 | Korus et al. |
| 2015/0210025 A1 | 7/2015 | Martin |
| 2015/0246577 A1 | 9/2015 | Fudemoto et al. |
| 2015/0251493 A1 | 9/2015 | Ma |
| 2015/0273945 A1 | 10/2015 | Fudemoto et al. |
| 2015/0273946 A1 | 10/2015 | Abe et al. |
| 2015/0283852 A1 | 10/2015 | Chen et al. |
| 2015/0283856 A1 | 10/2015 | Pfrenger et al. |
| 2015/0343840 A1 | 12/2015 | Kinney et al. |
| 2015/0343845 A1 | 12/2015 | Kinney et al. |
| 2016/0016426 A1 | 1/2016 | Endicott |
| 2016/0046091 A1 | 2/2016 | Kinney et al. |
| 2016/0046092 A1 | 2/2016 | Kinney et al. |
| 2016/0046153 A1 | 2/2016 | Yoo |
| 2016/0046154 A1 | 2/2016 | Kim |
| 2016/0096400 A1 | 4/2016 | Nomura et al. |
| 2016/0107402 A1 | 4/2016 | Cron et al. |
| 2016/0121656 A1 | 5/2016 | Sugiya et al. |
| 2016/0128266 A1 | 5/2016 | Phely et al. |
| 2016/0152078 A1 | 6/2016 | Korus et al. |
| 2016/0159150 A1 | 6/2016 | Pfrenger et al. |
| 2016/0159152 A1 | 6/2016 | Delfino et al. |
| 2016/0167434 A1 | 6/2016 | Nishida et al. |
| 2016/0193876 A1 | 7/2016 | Kyo et al. |
| 2016/0193877 A1 | 7/2016 | Jang et al. |
| 2016/0200144 A1 | 7/2016 | Iwamura et al. |
| 2016/0214435 A1 | 7/2016 | Schaedler |
| 2016/0221284 A1 | 8/2016 | Andrews et al. |
| 2016/0236514 A1 | 8/2016 | Abe |
| 2016/0250893 A1 | 9/2016 | Shoji et al. |
| 2016/0257170 A1 | 9/2016 | Sugiya et al. |
| 2016/0272006 A1 | 9/2016 | Abe |
| 2016/0280005 A1 | 9/2016 | Cron et al. |
| 2016/0288569 A1 | 10/2016 | Parrondry et al. |
| 2016/0297244 A1 | 10/2016 | Abe |
| 2016/0303812 A1 | 10/2016 | LePretre et al. |
| 2016/0311479 A1 | 10/2016 | Rudakevych |
| 2016/0312014 A1 | 10/2016 | Lemerle et al. |
| 2016/0318342 A1 | 11/2016 | Deltino |
| 2016/0319111 A1 | 11/2016 | Chouvel et al. |
| 2016/0347119 A1 | 12/2016 | Quiroz |
| 2017/0001470 A1 | 1/2017 | Merino Lopez |
| 2017/0008338 A1 | 1/2017 | Merino Lopez |
| 2017/0008341 A1 | 1/2017 | Martin |
| 2017/0008342 A1 | 1/2017 | Martin et al. |
| 2017/0015134 A1 | 1/2017 | Ma |
| 2017/0015141 A1 | 1/2017 | Shoji et al. |
| 2017/0057288 A1 | 3/2017 | Sugiya et al. |
| 2017/0057289 A1 | 3/2017 | Pratt |
| 2017/0057294 A1 | 3/2017 | Iwamura et al. |
| 2017/0072746 A1 | 3/2017 | Iwamura et al. |
| 2017/0080756 A1 | 3/2017 | Van Riper et al. |
| 2017/0087930 A1 | 3/2017 | McMaster et al. |
| 2017/0087931 A1 | 3/2017 | Gaylo et al. |
| 2017/0087937 A1 | 3/2017 | Korus et al. |
| 2017/0096032 A1 | 4/2017 | Iwamura et al. |
| 2017/0106699 A1 | 4/2017 | Iwamura et al. |
| 2017/0113484 A1 | 4/2017 | Iwamura et al. |
| 2017/0113488 A1 | 4/2017 | Iwamura et al. |
| 2017/0113490 A1 | 4/2017 | Iwamura et al. |
| 2017/0113491 A1 | 4/2017 | Iwamura et al. |
| 2017/0120671 A1 | 5/2017 | Miles et al. |
| 2017/0120680 A1 | 5/2017 | Takahashi et al. |
| 2017/0120681 A1 | 5/2017 | Toyosawa |
| 2017/0129285 A1 | 5/2017 | Toyosawa |
| 2017/0136814 A1 | 5/2017 | Abe et al. |
| 2017/0157983 A1 | 6/2017 | Siegel |
| 2017/0157984 A1 | 6/2017 | Van Riper et al. |
| 2017/0166002 A1 | 6/2017 | Benzing, II et al. |
| 2017/0174002 A1 | 6/2017 | Downing |
| 2017/0174003 A1 | 6/2017 | Benzing, II et al. |
| 2017/0174004 A1 | 6/2017 | Benzing, II |
| 2017/0174005 A1 | 6/2017 | Van Riper et al. |
| 2017/0197467 A1 | 7/2017 | Iwamura et al. |
| 2017/0232787 A1 | 8/2017 | Hasegawa et al. |
| 2017/0239994 A1 | 8/2017 | Raulerson et al. |
| 2017/0253084 A1 | 9/2017 | Takahashi et al. |
| 2017/0267028 A1 | 9/2017 | Pfrenger et al. |
| 2017/0291453 A1 | 10/2017 | Sugiya et al. |
| 2017/0297370 A1 | 10/2017 | Korus et al. |
| 2017/0297371 A1 | 10/2017 | Sportelli |
| 2017/0297372 A1 | 10/2017 | Talbot et al. |
| 2017/0297373 A1 | 10/2017 | Sportelli |
| 2017/0297374 A1 | 10/2017 | Sportelli |
| 2017/0305192 A1 | 10/2017 | Yokoyama |
| 2017/0305195 A1 | 10/2017 | Takahashi et al. |
| 2017/0326915 A1 | 11/2017 | Son et al. |
| 2017/0334245 A1 | 11/2017 | Laskowitz |
| 2017/0368775 A1 | 12/2017 | Thompson |
| 2018/0001699 A1 | 1/2018 | Shoji |
| 2019/0111645 A1 | 4/2019 | Thompson |
| 2020/0009916 A1 | 1/2020 | Thompson et al. |

FOREIGN PATENT DOCUMENTS

| | | |
|---|---|---|
| CA | 2915483 A1 | 12/2014 |
| CA | 2976055 A1 | 8/2016 |
| CA | 3006801 A1 | 6/2017 |
| CA | 3008828 A1 | 6/2017 |
| CA | 3008846 A1 | 6/2017 |
| EP | 0502353 | 9/1992 |
| EP | 0334522 B1 | 11/1994 |
| EP | 1378377 A2 | 1/2004 |
| EP | 0353006 | 1/2009 |
| JP | 3923073 B1 | 5/2007 |
| JP | 2011-219009 | 11/2011 |
| NL | 2002956 | 12/2010 |
| WO | 96/05917 A1 | 2/1996 |
| WO | 2000018592 | 4/2000 |
| WO | 2000037269 | 6/2000 |
| WO | 2006022788 | 3/2006 |
| WO | 2008/045098 A1 | 4/2008 |
| WO | 2008118983 | 10/2008 |
| WO | 2009005945 | 1/2009 |
| WO | 2009005946 | 1/2009 |
| WO | 2009042460 | 4/2009 |
| WO | 2010138150 | 12/2010 |
| WO | 2011011419 | 1/2011 |
| WO | 2013095499 | 6/2013 |
| WO | 2014036415 | 3/2014 |
| WO | 2014039814 | 3/2014 |
| WO | 2014093135 | 6/2014 |
| WO | 2014172095 | 10/2014 |
| WO | 2015013036 | 1/2015 |
| WO | 2015017100 | 2/2015 |
| WO | 2015017133 | 2/2015 |

(56) References Cited

FOREIGN PATENT DOCUMENTS

| | | |
|---|---|---|
| WO | 2015023969 | 2/2015 |
| WO | 2015052987 | 4/2015 |
| WO | 2015072222 | 5/2015 |
| WO | 2015100080 | 7/2015 |
| WO | 2015112417 | 7/2015 |
| WO | 2015112720 | 7/2015 |
| WO | 2015141579 | 9/2015 |
| WO | 2015165777 | 11/2015 |
| WO | 2015175002 | 11/2015 |
| WO | 2015175003 | 11/2015 |
| WO | 2015187394 | 12/2015 |
| WO | 2015194087 | 12/2015 |
| WO | 2015194088 | 12/2015 |
| WO | 2015194277 | 12/2015 |
| WO | 2015198387 | 12/2015 |
| WO | 2015198637 | 12/2015 |
| WO | 2016021300 | 2/2016 |
| WO | 2016056444 | 4/2016 |
| WO | 2016072181 | 5/2016 |
| WO | 2016084512 | 6/2016 |
| WO | 2016089480 | 6/2016 |
| WO | 2016098477 | 6/2016 |
| WO | 2016100004 | 6/2016 |
| WO | 2016100005 | 6/2016 |
| WO | 2016100006 | 6/2016 |
| WO | 2016105654 | 6/2016 |
| WO | 2016109557 | 7/2016 |
| WO | 2016109648 | 7/2016 |
| WO | 2016109702 | 7/2016 |
| WO | 2016114167 | 7/2016 |
| WO | 2016114168 | 7/2016 |
| WO | 2016116457 | 7/2016 |
| WO | 2016/126983 A1 | 8/2016 |
| WO | 2016123180 | 8/2016 |
| WO | 2016148295 | 9/2016 |
| WO | 2016152887 | 9/2016 |
| WO | 2016189126 | 12/2016 |
| WO | 2016189209 | 12/2016 |
| WO | 2016203098 | 12/2016 |
| WO | 2017024366 | 2/2017 |
| WO | 2017035630 | 3/2017 |
| WO | 2017039451 | 3/2017 |
| WO | 2017039604 | 3/2017 |
| WO | 2017040390 | 3/2017 |
| WO | 2017052010 | 3/2017 |
| WO | 2017061405 | 4/2017 |
| WO | 2017067869 | 4/2017 |
| WO | 2017072560 | 5/2017 |
| WO | 2017072562 | 5/2017 |
| WO | 2017086993 | 5/2017 |
| WO | 2017087853 | 5/2017 |
| WO | 2017/106704 A2 | 6/2017 |
| WO | 2017/106723 A1 | 6/2017 |
| WO | 2017110769 | 6/2017 |
| WO | 2017111944 | 6/2017 |
| WO | 2017112130 | 6/2017 |
| WO | 2017116384 | 7/2017 |
| WO | 2017116385 | 7/2017 |
| WO | 2017116386 | 7/2017 |
| WO | 2017116389 | 7/2017 |
| WO | 2017116390 | 7/2017 |
| WO | 2017116454 | 7/2017 |
| WO | 2017116463 | 7/2017 |
| WO | 2017116472 | 7/2017 |
| WO | 2017116475 | 7/2017 |
| WO | 2017116478 | 7/2017 |
| WO | 2017116481 | 7/2017 |
| WO | 2017116556 | 7/2017 |
| WO | 2017116557 | 7/2017 |
| WO | 2017116561 | 7/2017 |
| WO | 2017116565 | 7/2017 |
| WO | 2017116804 | 7/2017 |
| WO | 2017117365 | 7/2017 |
| WO | 2017117368 | 7/2017 |
| WO | 2017117587 | 7/2017 |
| WO | 2017117598 | 7/2017 |
| WO | 2017117599 | 7/2017 |
| WO | 2017117605 | 7/2017 |
| WO | 2017117606 | 7/2017 |
| WO | 2017131742 | 8/2017 |
| WO | 2017159899 | 9/2017 |
| WO | 2017200645 | 11/2017 |
| WO | 2018/111339 A1 | 6/2018 |
| WO | 2018/112650 A1 | 6/2018 |
| WO | 2018/227276 A1 | 12/2018 |
| WO | 2019/119155 A1 | 6/2019 |

OTHER PUBLICATIONS https://en.wikipedia.org/wiki/Poisson%27s_ratio, no date.*
Aug. 16, 2018 Search Report issued in European Patent Application No. 16747290.1.
May 24, 2019 Search Report issued in European Patent Application No. 16876817.4.
Mar. 7, 2019 International Preliminary Report on Patentability issued in International Patent Application No. PCT/US2017/035008.
Jul. 25, 2018 International Search Report issued in PCT Patent Application No. PCT/CA2018/050534.
Mar. 28, 2019 International Search Report issued in connection with International PCT Application No. PCT/CA2018/051658.
May 1, 2019 Office Action issued in U.S. Appl. No. 16/208,916.
Jul. 19, 2017 Notice of Allowance issued in U.S. Appl. No. 14/304,217.
Sep. 27, 2018 Notice of Allowance issued in U.S. Appl. No. 15/677,391.
Jul. 25, 2018 Written Opinion issued in PCT Patent Application No. PCT/CA2018/050534.
Mar. 28, 2019 Written Opinion issued in International PCT application No. PCT/CA2018/051658.
Michelin North America, "The Michelin X Tweel Turf", Targeted News Services, Apr. 3, 2015, 2 pages.
Tweel et al., "The Airless Radial Tire™ & wheel assembly. Designed for use on skid steer loaders. v no maintenance v no compromise v no downtime Now available in two models : All Tterrain for use on a wide range of surfaces, and Hard Surface for maximum tread life on pavement"., Jun. 16, 2015, 2.
Powell, Robert, "Relationships between lane change performance and open-loop handling metrics", Clemson University Tigerprints, Jan. 1, 2009, 182 pages.
Anonymous, "Michelin's Tweel Airless" Tires Available for Skid Steers, Mowers-Real Agriculture, Jun. 17, 2015, 2 pages.
A.M. Aboul-Yazid et al., "Ellet of spokes structures on characteristics performance of non-pneumatic tires", International Journal of Automotive and Mechanical Engineering, vol. 11, Jun. 30, 2015, 12 pages.
Feb. 19, 2018 International Search Report issued in International Patent Application No. PCT/CA2017/051577.
Feb. 19, 2018 Written Opinion issued in International Patent Application No. PCT/CA2017/051577.
Taheri; "Center for Tire Research (CenTiRe);" presentation at Virginia Tech; Nov. 8, 2017; (emphasis on slide 34).
International Search Report issued in connection with PCT/2017/035008 dated Oct. 30, 2017, 4 pages.
Written Opinion issued in connection with PCT/2017/035008 dated Oct. 30, 2017, 15 pages.
Office Action issued in connection with U.S. Appl. No. 14/304,217 dated Dec. 15, 2015, 15 pages.
Final Office Action issued in connection with U.S. Appl. No. 14/304,217 dated May 19, 2016, 10 pages.
Notice of Allowance issued in connection with U.S. Appl. No. 14/304,217 dated Nov. 3, 2016, 9 pages.
International Preliminary Report on Patentability issued in International Patent Application No. PCT/US2016/016630 dated Mar. 2, 2017, 40 pages.
International Preliminary Report on Patentability issued in connection with International Patent Application No. PCT/US2014/042327 dated Dec. 23, 2015, 6 pages.

(56) References Cited

OTHER PUBLICATIONS

International Search Report issued in connection with International Application No. PCT/US2014/042327 dated Nov. 3, 2014, 2 pages.
Written Opinion issued in connection with International Applicatrion No. PCT/US2014/042327 dated Nov. 3, 2014, 5 pages.
Supplementary European Search Report issued in connection with European Patent Application No. 14811289.9 dated Feb. 1, 2017, 1 page.
Muvdi, B.B. et al. "Shear and Bending Moment in Beams", Engineering Mechanics of Materials; Macmillan Publishing Co., Inc.; New York, NY; pp. 23-31.
Muvdi, B.B. et al. "Deflections of Beams", Engineering Mechanics of Materials; Macmillan Publishing Co., Inc.; New York, NY; pp. 266-333.
Rhyne, T. B. and Cron, S. M., "Development of a Non-Pneumatic Wheel," Tire Science and Technology, TSTCA, vol. 34, No. 3, Jul.-Sep. 2006, pp. 150-169.
Mar. 27, 2018 Office Action issued in U.S. Appl. No. 15/677,391.
Nov. 13, 2018 Examiner's Report issued in European Patent Application No. 14811289.9.
Feb. 16, 2017 International Preliminary Report on Patentability issued in International Patent Application No. PCT/US2016/016630.
Apr. 13, 2016 Written Opinion issued in International Patent Application No. PCT/US2016/016630.
Apr. 13, 2016 Search Report issued in International Patent Application No. PCT/US2016/016630.
Aug. 12, 2019 Final Office Action issued in U.S. Appl. No. 16/208,916.
Jun. 19, 2019 Summons to attend oral proceedings pursuant to Rule 115(1) EPC issued European Patent Application No. 14811289.9.
Aug. 20, 2019 International Search Report and Written Opinion issued in International PCT application No. PCT/CA2019/050722.
Dec. 10, 2019 International Search Report issued in International PCT application No. PCT/CA2019/051303.
Dec. 10, 2019 Written Opinion issued in International PCT application No. PCT/CA2019/051303.
Nov. 11, 2019 Communication 94(3) from the Examining Division (EPO) issued in European application No. 16747290.1.
Jan. 27, 2020 International Search Report issued in International PCT application No. PCT/CA2019/051514.
Jan. 27, 2020 Written Opinion issued in International PCT application No. PCT/CA2019/051514.
Timothy B. Rhyne, Steven M. Cron, "Development of a Non-Pneumatic Wheel," submitted for presentation at the 2005 Tire Society meeting, and for consideration for publication in the journal Tire science and Technology, 34 pages.
C.W. Lim, et al.—"Timoshenko curved beam bending solution in terms of Euler-Bernoulli solutions" Archive of Applied Mechanics 67 (1997)—179-190 Springer—Verlag 1997.
Amir Gasmi et al. "Closed form of a shear deformable, extensional ring in contact between two rigid surfaces" International Journal of Solids and Structures 48 (2011) 843-853.
Amir Gasmi et al. "Development of a two-bidimensional model of a compliant non pneumatic tire" International Journal of Solids and Structures 49 (2012) 1723-1740.
Jan. 27, 2020 Decision to Refuse a European Patent Application, issued in connection with European Patent Application 1411289.9.
Jaehyung Ju et al. "Rolling Resistance of a Nonpneumatic Tire Having a Porous Elastomer Composite Shear Band" Tire Science and Technology 41(3); pp. 154-173' Jul. 2013.

* cited by examiner

NON-PNEUMATIC TIRE AND OTHER ANNULAR DEVICES

FIELD

The invention generally relates to non-pneumatic tires (NPTs), such as for vehicles (e.g., industrial vehicles such as construction vehicles; all-terrain vehicles (ATVs); agricultural vehicles; automobiles and other road vehicles; etc.) and/or other machines, and to other annular devices.

BACKGROUND

Wheels for vehicles and other machines may comprise non-pneumatic tires (sometimes referred to as NPTs) instead of pneumatic tires.

Pneumatic tires are market leaders across a wide variety of size, speed, and load requirements. For example, radial pneumatic tires are found on automotive tires of 0.6 meter diameter that carry 0.5 metric tons, and also on tires used in mining operations of 4 meter diameter that carry 50 metric tons. Pneumatic tires are thus scalable.

Pneumatic tires offer high load capacity per unit mass, along with a large contact area and relatively low vertical stiffness. High contact area results in the ability to both efficiently generate high tangential forces and obtain excellent wear characteristics. However, pneumatic tires are also prone to flats.

Non-pneumatic tires offer flat-free operation, yet generally contain some compromise. For various reasons, non-pneumatic tires do not have a predominant market share in various industries because they tend to be expensive, heavy, have a poor ride quality, have limited speed capability under heavy load, and/or have lower traction potential, compared to pneumatic tires. For example, in construction and other field with large tires, in the common dimension 20.5 inch×25 inch (20.5 inches wide, 25 inch diameter wheel), currently available non-pneumatic tires weighs around 2000 lbs., whereas a pneumatic tire and steel wheel only weigh around 650 lbs.

Non-pneumatic tires in this size are usually solid, with the addition of circular cutouts in the tire sidewall to reduce the compressive stiffness of the structure. Because of this solid construction, heat build-up is problematic. Elastomers are generally good insulators, and therefore such structures tend to retain heat. This reduces their utility in practical use in some cases.

Other annular devices, such as, for instance, tracks for vehicles and/or conveyor belts, may in some cases be affected by similar considerations.

For these and other reasons, there is a need to improve non-pneumatic tires and other annular devices.

SUMMARY

According to an aspect of the invention, there is provided a non-pneumatic tire comprising an annular beam. The annular beam comprises a plurality of layers of different elastomeric materials. The annular beam is free of a substantially inextensible reinforcing layer running in a circumferential direction of the non-pneumatic tire.

According to another aspect of the invention, there is provided a wheel comprising a hub and a non-pneumatic tire. The non-pneumatic tire comprises an annular beam. The annular beam comprises a plurality of layers of different elastomeric materials. The annular beam is free of a substantially inextensible reinforcing layer running in a circumferential direction of the non-pneumatic tire.

According to another aspect of the invention, there is provided an annular beam comprising a plurality of layers of different elastomeric materials. The annular beam is free of a substantially inextensible reinforcing layer running in a circumferential direction of the annular beam.

According to another aspect of the invention, there is provided a method of making a non-pneumatic tire. The method comprises providing a plurality of different elastomeric materials and forming an annular beam of the non-pneumatic tire such that the annular beam comprises a plurality of layers of the different elastomeric materials and is free of a substantially inextensible reinforcing layer running in a circumferential direction of the non-pneumatic tire.

According to another aspect of the invention, there is provided a method of making an annular beam. The method comprises providing a plurality of different elastomeric materials and forming the annular beam such that the annular beam comprises a plurality of layers of the different elastomeric materials and is free of a substantially inextensible reinforcing layer running in a circumferential direction of the annular beam.

According to another aspect of the invention, there is provided a non-pneumatic tire comprising an annular beam. The annular beam comprises a plurality of layers of different elastomeric materials. The annular beam comprises a plurality of openings distributed in a circumferential direction of the non-pneumatic tire.

According to another aspect of the invention, there is provided a wheel comprising a hub and a non-pneumatic tire. The non-pneumatic tire comprises an annular beam. The annular beam comprises a plurality of layers of different elastomeric materials. The annular beam comprises a plurality of openings distributed in a circumferential direction of the non-pneumatic tire.

According to another aspect of the invention, there is provided an annular beam. The annular beam comprises a plurality of layers of different elastomeric materials. The annular beam comprises a plurality of openings distributed in a circumferential direction of the annular beam.

According to another aspect of the invention, there is provided a method of making a non-pneumatic tire. The method comprises providing a plurality of different elastomeric materials and forming an annular beam of the non-pneumatic tire such that the annular beam comprises a plurality of layers of the different elastomeric materials and a plurality of openings distributed in a circumferential direction of the non-pneumatic tire.

According to another aspect of the invention, there is provided a method of making an annular beam. The method comprises providing a plurality of different elastomeric materials and forming the annular beam such that the annular beam comprises a plurality of layers of the different elastomeric materials and a plurality of openings distributed in a circumferential direction of the annular beam.

According to another aspect of the invention, there is provided a wheel comprising a hub and a non-pneumatic tire. A ratio of a width of the non-pneumatic tire over an outer diameter of the non-pneumatic tire is no more than 0.1 and a ratio of a diameter of the hub over the outer diameter of the non-pneumatic tire is no more than 0.5.

According to another aspect of the invention, there is provided a wheel comprising a hub and a non-pneumatic tire. A ratio of a length of a contact patch of the nonpneumatic tire at a design load over an outer radius of the non-pneumatic tire is at least 0.4

According to another aspect of the invention, there is provided a non-pneumatic tire comprising an annular beam and a tread. The annular beam is free of a substantially inextensible reinforcing layer running in a circumferential direction of the non-pneumatic tire. The tread comprises elastomeric material and a reinforcing layer disposed within the elastomeric material and extending in the circumferential direction of the non-pneumatic tire.

These and other aspects of the invention will now become apparent to those of ordinary skill in the art upon review of the following description of embodiments of the invention in conjunction with the accompanying drawings.

BRIEF DESCRIPTION OF THE DRAWINGS

A detailed description of embodiments is provided below, by way of example only, with reference to the accompanying drawings, in which.

DETAILED DESCRIPTION OF EMBODIMENTS

Figure 1:
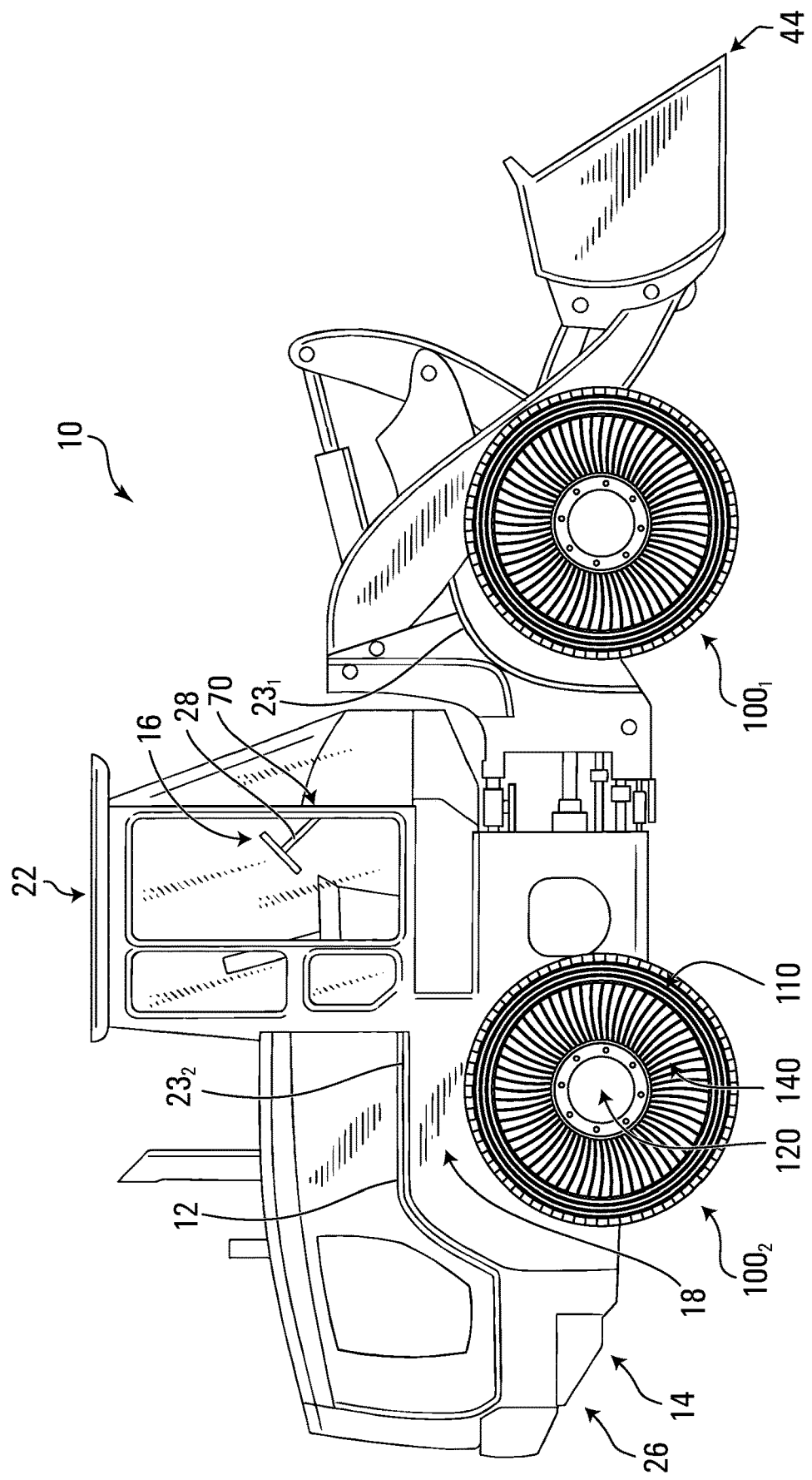
FIG. 1 shows an example of a vehicle comprising wheels that comprises non-pneumatic tires in accordance with an embodiment of the invention.

FIG. 1 shows an example of a vehicle 10 comprising a plurality of wheels $100_1$-$100_4$ in accordance with an embodiment of the invention. In this embodiment, the vehicle 10 is an industrial vehicle. The industrial vehicle 10 is a heavy-duty vehicle designed to travel off-road to perform industrial work using a work implement 44. In this embodiment, the industrial vehicle 10 is a construction vehicle for performing construction work using the work implement 44. More particularly, in this embodiment, the construction vehicle 10 is a loader (e.g., a skid-steer loader). The construction vehicle 10 may be a bulldozer, a backhoe loader, an excavator, a dump truck, or any other type of construction vehicle in other embodiments. In this example, the construction vehicle 10 comprises a frame 12, a powertrain 14, a steering system 16, a suspension 18, the wheels $100_1$-$100_4$, and an operator cabin 22, which enable a user, i.e., an operator, of the construction vehicle 10 to move the vehicle 10 on the ground and perform work using the work implement 44. The construction vehicle 10 has a longitudinal direction, a widthwise direction, and a height direction.

In this embodiment, as further discussed later, the wheels $100_1$-$100_4$ are non-pneumatic (i.e., airless) and may be designed to enhance their use and performance and/or use and performance of the construction vehicle 10, including, for example, by having a high load-carrying capacity while being relatively lightweight.

The powertrain 14 is configured for generating motive power and transmitting motive power to respective ones of the wheels $100_1$-$100_4$ to propel the construction vehicle 10 on the ground. To that end, the powertrain 14 comprises a prime mover 26, which is a source of motive power that comprises one or more motors. For example, in this embodiment, the prime mover 26 comprises an internal combustion engine. In other embodiments, the prime mover 26 may comprise another type of motor (e.g., an electric motor) or a combination of different types of motor (e.g., an internal combustion engine and an electric motor). The prime mover 26 is in a driving relationship with one or more of the wheels $100_1$-$100_4$. That is, the powertrain 14 transmits motive power generated by the prime mover 26 to one or more of the wheels $100_1$-$100_4$ (e.g., via a transmission and/or a differential) in order to drive (i.e., impart motion to) these one or more of the wheels $100_1$-$100_4$.

The steering system 16 is configured to enable the operator to steer the construction vehicle 10 on the ground. To that end, the steering system 16 comprises a steering device 28 that is operable by the operator to direct the construction vehicle 10 along a desired course on the ground. The steering device 28 may comprise a steering wheel or any other steering component (e.g., a joystick) that can be operated by the operator to steer the construction vehicle 10. The steering system 16 responds to the operator interacting with the steering device 28 by turning respective ones of the wheels $100_1$-$100_4$ to change their orientation relative to part of the frame 12 of the construction vehicle 10 in order to cause the vehicle 10 to move in a desired direction. In this example, a front frame member $23_1$ carrying front ones of the wheels $100_1$-$100_4$ is turnable in response to input of the operator at the steering device 28 to change its orientation and thus the orientation of the front ones of the wheels $100_1$-$100_4$ relative to a rear frame member $23_2$ of the construction vehicle 10 in order to steer the construction vehicle 10 on the ground.

The suspension 18 is connected between the frame 12 and the wheels $100_1$-$100_4$ to allow relative motion between the frame 12 and the wheels $100_1$-$100_4$ as the construction vehicle 10 travels on the ground. For example, the suspension 18 may enhance handling of the construction vehicle 10 on the ground by absorbing shocks and helping to maintain traction between the wheels $100_1$-$100_4$ and the ground. The suspension 18 may comprise an arrangement of springs and dampers. A spring may be a coil spring, a leaf spring, a gas spring (e.g., an air spring), or any other elastic object used to store mechanical energy. A damper (also sometimes referred to as a "shock absorber") may be a fluidic damper (e.g., a pneumatic damper, a hydraulic damper, etc.), a magnetic damper, or any other object which absorbs or dissipates kinetic energy to decrease oscillations. In some cases, a single device may itself constitute both a spring and a damper (e.g., a hydropneumatic, hydrolastic, or hydragas suspension device).

The operator cabin 22 is where the operator sits and controls the construction vehicle 10. More particularly, the operator cabin 22 comprises a user interface 70 including a set of controls that allow the operator to steer the construction vehicle 10 on the ground and operate the work implement 44. The user interface 70 also comprises an instrument panel (e.g., a dashboard) which provides indicators (e.g., a speedometer indicator, a tachometer indicator, etc.) to convey information to the operator.

The wheels $100_1$-$100_4$ engage the ground to provide traction to the construction vehicle 10. More particularly, in this example, the front ones of the wheels $100_1$-$100_4$ provide front traction to the construction vehicle 10 while the rear ones of the wheels $100_1$-$100_4$ provide rear traction to the construction vehicle 10.

Figure 2:
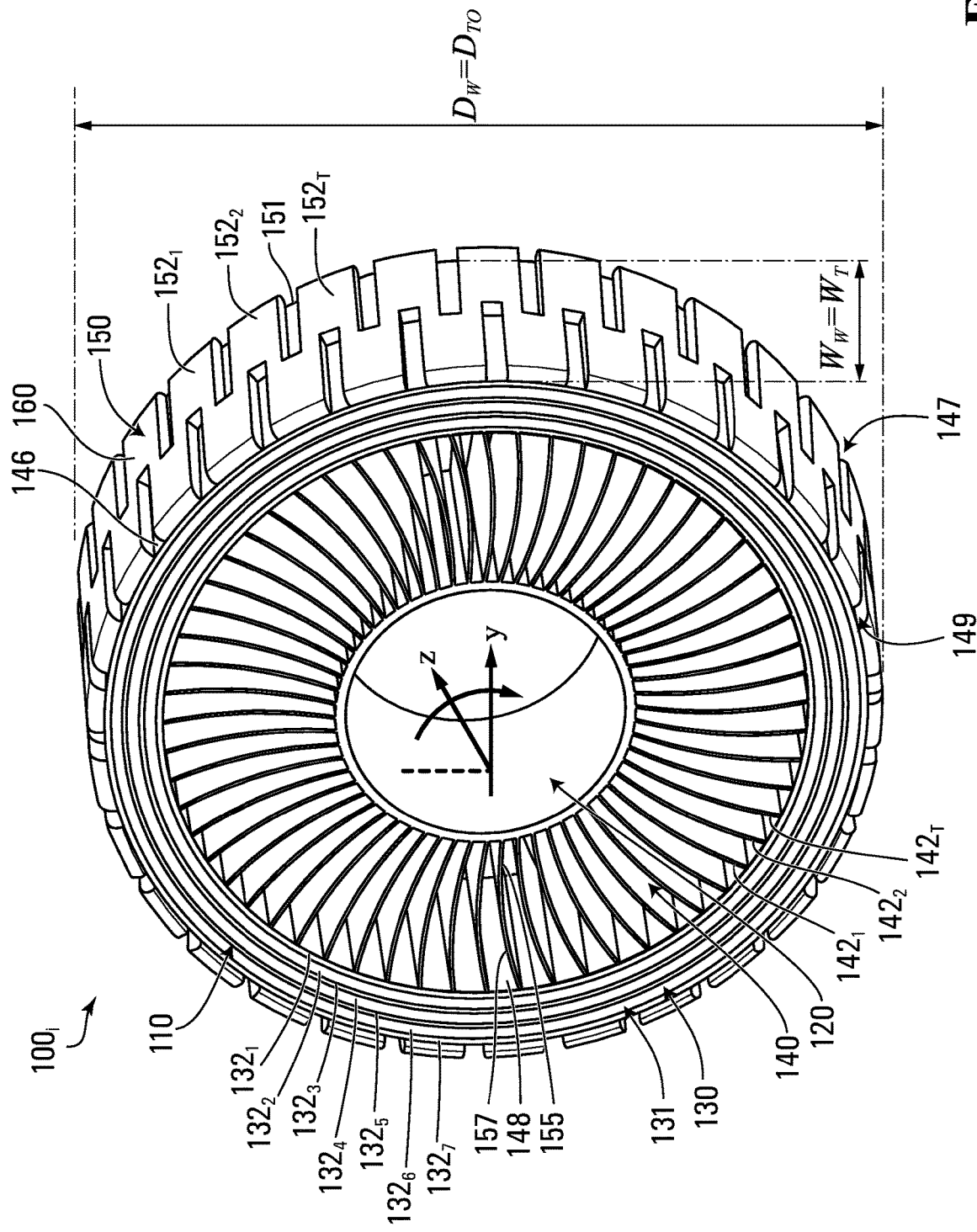
FIG. 2 shows a perspective view of a wheel comprising a non-pneumatic tire.
Figure 3:
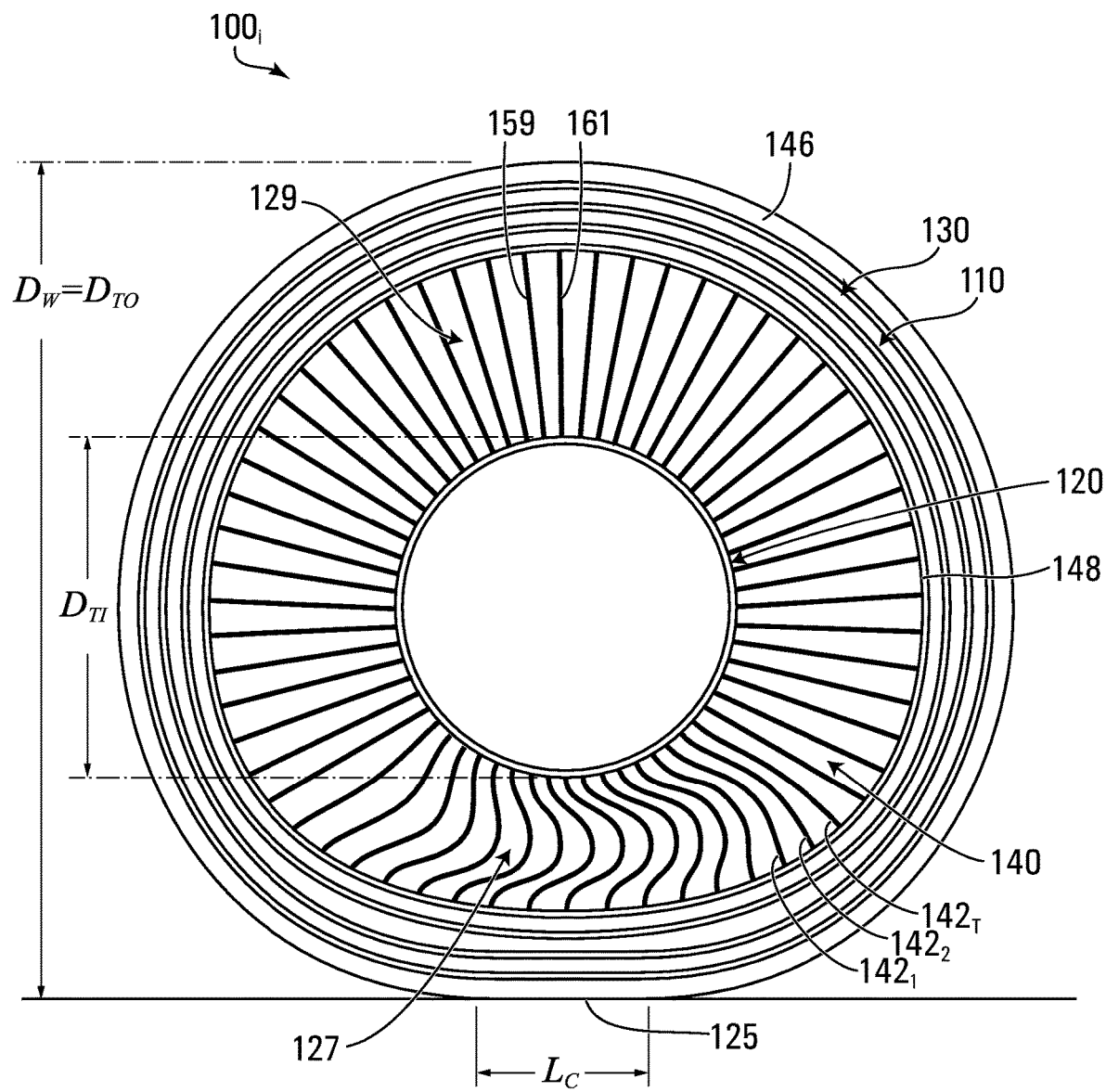
FIG. 3 shows a side-elevation view of the wheel and a contact patch of the wheel.

Each wheel $100_i$ comprises a non-pneumatic tire 110 for contacting the ground and a hub 120 for connecting the wheel $100_i$ to an axle of the vehicle 10. The non-pneumatic tire 110 is a compliant wheel structure that is not supported by gas (e.g., air) pressure and that is resiliently deformable (i.e., changeable in configuration) as the wheel $100_i$ contacts the ground. With additional reference to FIG. 2, the wheel $100_i$ has an axial direction defined by an axis of rotation 180 of the wheel $100_i$ (also referred to as a "Y" direction), a radial direction (also referred to as a "Z" direction), and a circumferential direction (also referred to as a "X" direction). These axial, radial and circumferential directions also apply to components of the wheel $100_i$, including the non-pneumatic tire 110. The wheel's equatorial plane is that plane defined by the x-z axes, while the wheel's cross section is that plane defined by the y-z axes. The wheel $100_i$ has an outer diameter $D_W$ and a width $W_W$. It comprises an inboard lateral side 147 for facing a center of the vehicle in the widthwise direction of the vehicle and an outboard lateral side 149 opposite the inboard lateral side 147. As shown in FIG. 3, when it is in contact with the ground, the wheel $100_i$ has an area of contact 125 with the ground, which may be referred to as a "contact patch" of the wheel $100_i$ with the ground. The contact patch 125 of the wheel $100_i$, which is a contact interface between the non-pneumatic tire 110 and the ground, has a length $L_C$ in the circumferential direction of the wheel $100_i$ and a width $W_C$ in the axial direction of the wheel $100_i$.

The non-pneumatic tire 110 comprises an annular beam 130 and an annular support 140 that is disposed between the annular beam 130 and the hub 120 of the wheel $100_i$ and configured to support loading on the wheel $100_i$ as the wheel $100_i$ engages the ground. In this embodiment, the non-pneumatic tire 110 is tension-based such that the annular support 140 is configured to support the loading on the wheel $100_i$ by tension. That is, under the loading on the wheel $100_i$, the annular support 140 is resiliently deformable such that a lower portion 127 of the annular support 140 between the axis of rotation 180 of the wheel $100_i$ and the contact patch 125 of the wheel $100_i$ is compressed and an upper portion 129 of the annular support 140 above the axis of rotation 180 of the wheel $100_i$ is in tension to support the loading.

The annular beam 130 of the non-pneumatic tire 110 is configured to deflect under the loading on the wheel $100_i$ at the contact patch 125 of the wheel $100_i$ with the ground. In this embodiment, the annular beam 130 is configured to deflect such that it applies a homogeneous contact pressure along the length $L_C$ of the contact patch 125 of the wheel $100_i$ with the ground.

More particularly, in this embodiment, the annular beam 130 comprises a shear band 131 configured to deflect predominantly by shearing at the contact patch 125 under the loading on the wheel $100_i$. That is, under the loading on the wheel $100_i$, the shear band 131 deflects significantly more by shearing than by bending at the contact patch 125. The shear band 131 is thus configured such that, at a center of the contact patch 125 of the wheel $100_i$ in the circumferential direction of the wheel $100_i$, a shear deflection of the annular beam 130 is significantly greater than a bending deflection of the annular beam 130. For example, in some embodiments, at the center of the contact patch 125 of the wheel $100_i$ in the circumferential direction of the wheel $100_i$, a ratio of the shear deflection of the annular beam 130 over the bending deflection of the annular beam 130 may be at least 1.2, in some cases at least 1.5, in some cases at least 2, in some cases at least 3, in some cases at least 5, in some cases at least 7, and in some cases even more. For instance, in some embodiments, the annular beam 130 may be designed based on principles discussed in U.S. Patent Application Publication 2014/0367007, which is hereby incorporated by reference herein, in order to achieve the homogeneous contact pressure along the length $L_C$ of the contact patch 125 of the wheel $100_i$ with the ground.

In this embodiment, the shear band 131 of the annular beam 130 comprises a plurality of layers $132_1$-$132_N$ of different elastomeric materials $M_1$-$M_E$. The layers $132_1$-$132_N$ of the different elastomeric materials $M_1$-$M_E$ extend in the circumferential direction of the wheel $100_i$ and are disposed relative to one another in the radial direction of the wheel $100_i$. As further discussed later, in some embodiments, this laminate construction of the different elastomeric materials $M_1$-$M_E$ may enhance performance of the wheel $100_i$, including behavior of its contact patch 125 and may also help the annular beam 130 to have a high load to mass ratio, yet keep the simplicity of an elastomer structure, with no need for inextensible membranes or other composites or reinforcing elements. In this example, the layers $132_1$-$132_N$ of the different elastomeric materials $M_1$-$M_E$ are seven layers, namely the layers $132_1$-$132_7$ and the different elastomeric materials $M_1$-$M_E$ are two different elastomeric materials, namely the elastomeric materials $M_1$, $M_2$. The layers $132_1$-$132_N$ and/or the elastomeric materials $M_1$-$M_E$ may be present in any other suitable numbers in other examples.

More particularly, in this embodiment, the layers $132_1$, $132_3$, $132_5$ and $132_7$ are made of the elastomeric material $M_1$ while the layers $132_2$, $132_4$ and $132_6$ are made of the elastomeric material $M_2$ and are disposed between respective ones of the layers $132_1$, $132_3$, $132_5$ and $132_7$ made of the elastomeric material $M_1$. The layers $132_1$-$132_7$ of the annular beam 130 are thus arranged such that the different elastomeric materials M1, M2 alternate in the radial direction of the wheel $100_i$.

For instance, in this embodiment, the shear band 131 comprises the layer $132_1$, composed of elastomeric material $M_1$, lying on a radially inward extent of the shear band 131. The shear band 131 comprises the layer $132_2$, composed of elastomeric material $M_2$, lying on a radially outward extent of the layer $132_1$. The shear band 131 comprises the layer $132_3$, composed of elastomeric material $M_1$, lying on a radially outward extent of the layer $132_2$. In this embodiment, a laminate configuration of the elastomeric material of the shear band 131 is $M_1$/$M_2$/$M_1$. In other embodiments, the laminate configuration of the elastomeric material of the shear band 131 may be repeated any number of times. For example, in FIGS. 4 and 5, the laminate configuration of the elastomeric material of the shear band 131 from an inward to an outward extent of the shear band 131 is $M_1$/$M_2$/$M_1$/$M_2$/$M_1$/$M_2$/$M_1$. Each one of the layers $132_1$-$132_7$ is composed of a homogeneous elastomer in this example.

The different elastomeric materials $M_1$ and $M_2$ may differ in any suitable way. For example, in some embodiments, a stiffness of the elastomeric material $M_1$ may be different from a stiffness of the elastomeric material $M_2$. That is, the elastomeric material $M_1$ may be stiffer or less stiff than the elastomeric material $M_2$. For instance, a modulus of elasticity $E_1$ (i.e., Young's modulus) of the elastomeric material $M_1$ may be different from a modulus of elasticity $E_2$ of the elastomeric material $M_2$. A modulus of elasticity herein is Young's tensile modulus of elasticity measured per ISO 527-1/-2, and "Young's Modulus," "tensile modulus," and "modulus" may be used interchangeably herein. For example, in some embodiments, the modulus of elasticity $E_1$ of the elastomeric material $M_1$ may be greater than the modulus of elasticity $E_2$ of the elastomeric material $M_2$. For instance, in some embodiments, a ratio $E_1$/$E_2$ of the modulus of elasticity $E_1$ of the elastomeric material $M_1$ over the modulus of elasticity $E_2$ of the elastomeric material $M_2$ may be at least 2, in some cases at least 3, in some cases at least 4, in some cases at least 5, in some cases at least 6, in some cases at least 7, in some cases at least 8, and in some cases even more.

For example, in some embodiments, the modulus of elasticity $E_1$ of the elastomeric material $M_1$ may be at least 150 MPa, and in some cases at least 200 MPa or even more, while the modulus of elasticity $E_2$ of the elastomeric material $M_2$ may be no more than 50 MPa, and in some cases no more than 30 MPa or even less. As will be disclosed, such a modulus definition can be engineered to give a beam particular bending and shear properties that are favorable for use in the non-pneumatic tire 110.

Figure 4:
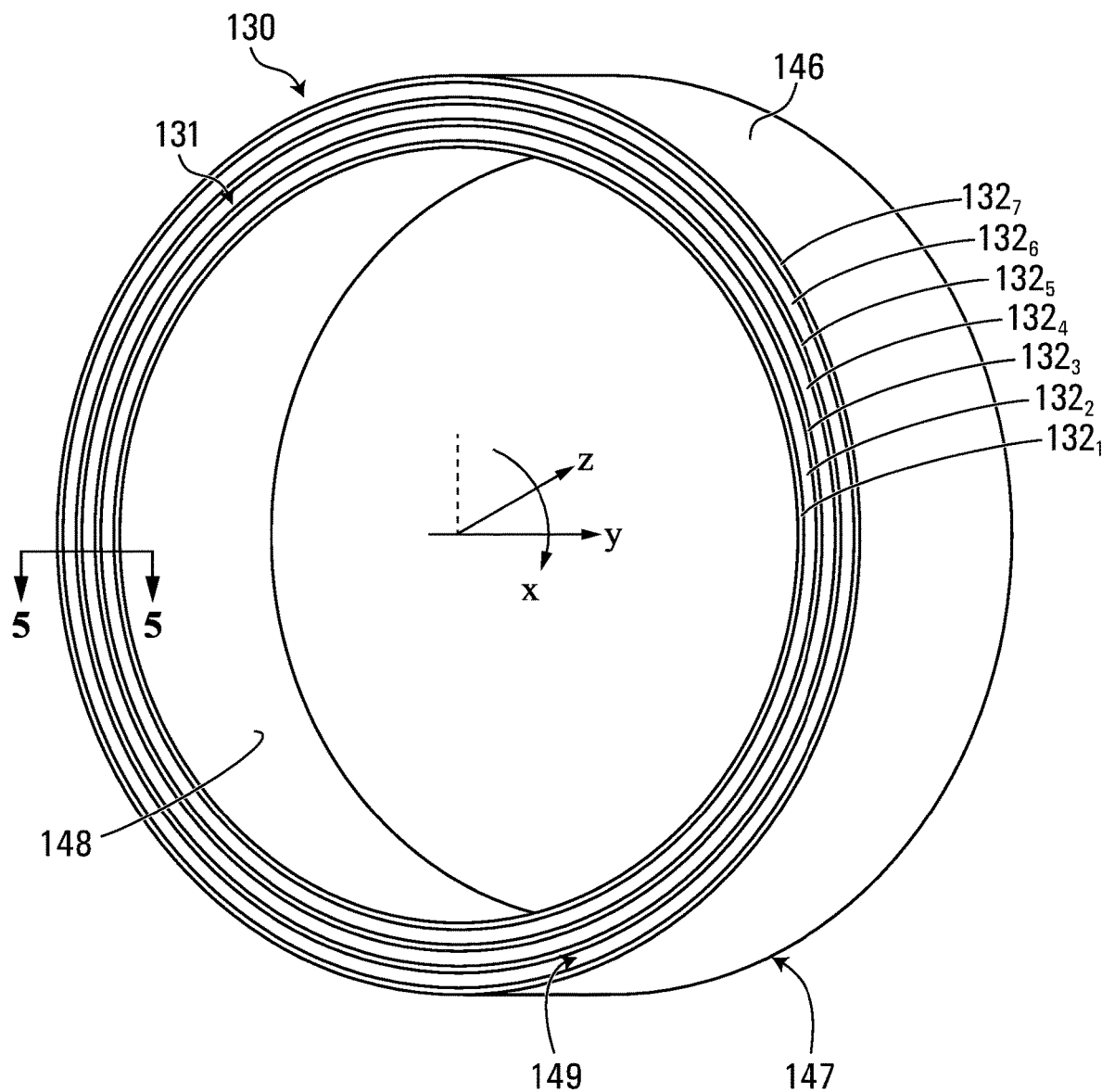
FIG. 4 shows a perspective view of an annular beam of the non-pneumatic tire.
Figure 5:
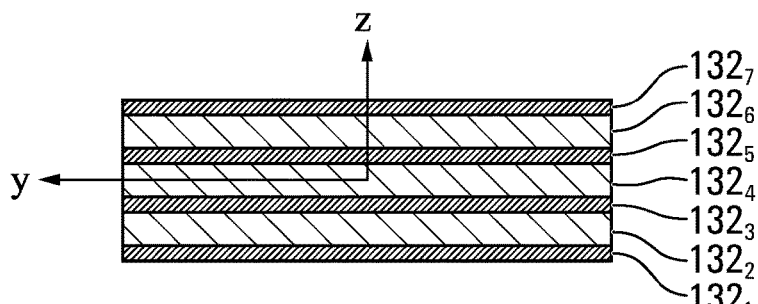
FIG. 5 shows a cross section of the annular beam.

FIG. 5 shows a cross section AA of the shear band 131 of the annular beam 130 where the layers $132_1$-$132_7$ of the annular beam 131 are shown. In some embodiments, such as the embodiment of FIGS. 4 and 5, the innermost layer $132_1$ and the outermost layer $132_7$ of the shear band 131 may be composed of the elastomeric material $M_1$ with the modulus of elasticity $E_1$ higher than the modulus of elasticity $E_2$ of the elastomeric material $M_2$. That is, in this embodiment, the elastomeric material with the higher modulus of elasticity may be used at the inner and outer radial extents of the shear band 131 of the annular beam 130.

In other embodiments, other repeating or non-repeating laminate configurations of the elastomeric material of the shear band 131 comprising the elastomeric material with the higher modulus of elasticity at the inner and outer radial extents of the shear band 131 may be used. That is, in these embodiments, multiple layers composed of multiple elastomeric materials may be used with or without symmetry of the laminate configuration of the elastomeric material of the shear band 131 and the shear band 131 may comprise at least three elastomeric materials in a laminate configuration. For example, the laminate configuration of the elastomeric material of the shear band 131 from an inward to an outward extent of the shear band 131 may be of the type $M_1$/$M_2$/$M_3$/$M_2$/$M_1$ or $M_1$/$M_2$/$M_3$/$M_1$ or any other combination thereof, where $M_3$ is an elastomeric material having a modulus of elasticity $E_3$ different from the modulus of elasticity $E_1$ of the elastomeric material $M_1$ and different from the modulus of elasticity $E_2$ of the elastomeric material $M_2$.

In some embodiments, and with further reference to FIGS. 4 and 5, each one of the layers $132_1$-$132_7$ of the shear band 131 extends from the inboard lateral side 147 to the outboard lateral side 149 of the non-pneumatic tire 110. That is, each one of the layers $132_1$-$132_7$ of the shear band 131 extends laterally through the shear band 131 in the axial direction of the wheel 100.

The different elastomeric materials $M_1$-$M_E$ may include any other suitable elastomers in various embodiments. For example, in some embodiments, suitable elastomeric materials include thermoplastic and thermoset polyurethane and thermoplastic and thermoset rubbers.

In this embodiment, the annular beam 130 is free of (i.e., without) a substantially inextensible reinforcing layer running in the circumferential direction of the wheel $100_i$ (e.g., a layer of metal, composite (e.g., carbon fibers, other fibers), and/or another material that is substantially inextensible running in the circumferential direction of the wheel $100_i$). In that sense, the annular beam 130 may be said to be "unreinforced". Thus, in this embodiment, useful behavior of the wheel $100_i$, including deflection and behavior of its contact patch 125, may be achieved without any substantially inextensible reinforcing layer running in the circumferential direction of the wheel $100_i$, which may help to reduce the weight and cost of the wheel $100_i$.

In this embodiment, the non-pneumatic tire 110 comprises a tread 150 for enhancing traction between the non-pneumatic tire 110 and the ground. The tread 150 is disposed about an outer peripheral extent 146 of the annular beam 130, in this case about the outermost layer $132_7$ of the shear band 131 composed of the elastomeric material $M_1$. More particularly, in this example the tread 150 comprises a tread base 151 that is at the outer peripheral extent 146 of the annular beam 130 and a plurality of tread projections $152_1$-$152_T$ that project from the tread base 151. The tread 150 may be implemented in any other suitable way in other embodiments (e.g., may comprise a plurality of tread recesses, etc.).

The annular support 140 is configured to support the loading on the wheel $100_i$ as the wheel $100_i$ engages the ground. As mentioned above, in this embodiment, the annular support 140 is configured to support the loading on the wheel $100_i$ by tension. More particularly, in this embodiment, the annular support 140 comprises a plurality of support members $142_1$-$142_T$ that are distributed around the non-pneumatic tire 110 and resiliently deformable such that, under the loading on the wheel $100_i$, lower ones of the support members $142_1$-$142_T$ in the lower portion 127 of the annular support 140 (between the axis of rotation 180 of the wheel $100_i$ and the contact patch 125 of the wheel $100_i$) are compressed and bend while upper ones of the support members $142_1$-$142_T$ in the upper portion 129 of the annular support 140 (above the axis of rotation 180 of the wheel $100_i$) are tensioned to support the loading. As they support load by tension when in the upper portion 129 of the annular support 140, the support members $142_1$-$142_T$ may be referred to as "tensile" members.

In this embodiment, the support members $142_1$-$142_T$ are elongated and extend from the annular beam 130 towards the hub 120 generally in the radial direction of the wheel $100_i$. In that sense, the support members $142_1$-$142_T$ may be referred to as "spokes" and the annular support 140 may be referred to as a "spoked" support.

More particularly, in this embodiment, each spoke $142_i$ extends from an inner peripheral surface 148 of the annular beam 130 towards the hub 120 generally in the radial direction of the wheel $100_i$ and from a first lateral end 155 to a second lateral end 157 in the axial direction of the wheel $100_i$. In this case, the spoke $142_i$ extends in the axial direction of the wheel $100_i$ for at least a majority of a width $W_T$ of the non-pneumatic tire 110, which in this case corresponds to the width $W_W$ of the wheel $100_i$. For instance, in some embodiments, the spoke $142_i$ may extend in the axial direction of the wheel $100_i$ for more than half, in some cases at least 60%, in some cases at least 80%, and in some cases an entirety of the width $W_T$ of the non-pneumatic tire 110. Moreover, the spoke $142_i$ has a thickness $T_S$ measured between a first surface face 159 and a second surface face 161 of the spoke $142_i$ that is significantly less than a length and width of the spoke $142_i$.

When the wheel $100_i$ is in contact with the ground and bears a load (e.g., part of a weight of the vehicle), respective ones of the spokes $142_1$-$142_T$ that are disposed in the upper portion 129 of the spoked support 140 (i.e., above the axis of rotation 180 of the wheel $100_i$) are placed in tension while respective ones of the spokes $142_1$-$142_T$ that are disposed in the lower portion 127 of the spoked support 140 (i.e., adjacent the contact patch 125) are placed in compression. The spokes $142_1$-$142_T$ in the lower portion 127 of the spoked support 140 which are in compression bend in response to the load. Conversely, the spokes $142_1$-$142_T$ in the upper portion 129 of the spoked support 140 which are placed in tension support the load by tension.

Figure 6:
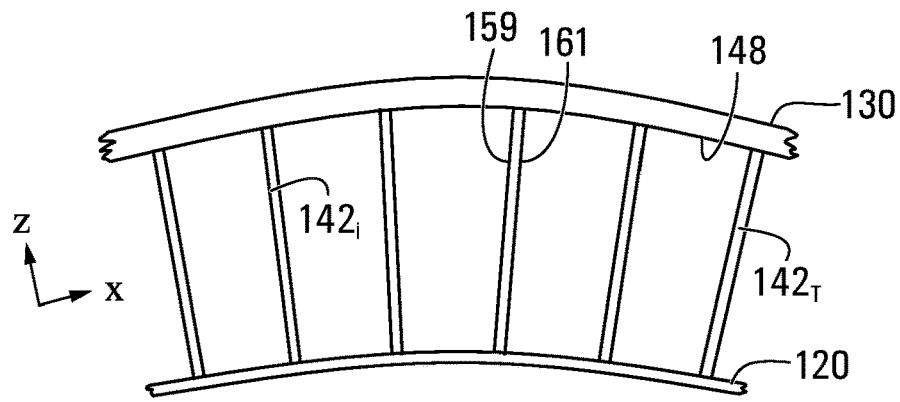
FIGS. 6 to 9 show a side-elevation view of various embodiments of an annular support of the non-pneumatic tire.
Figure 7:
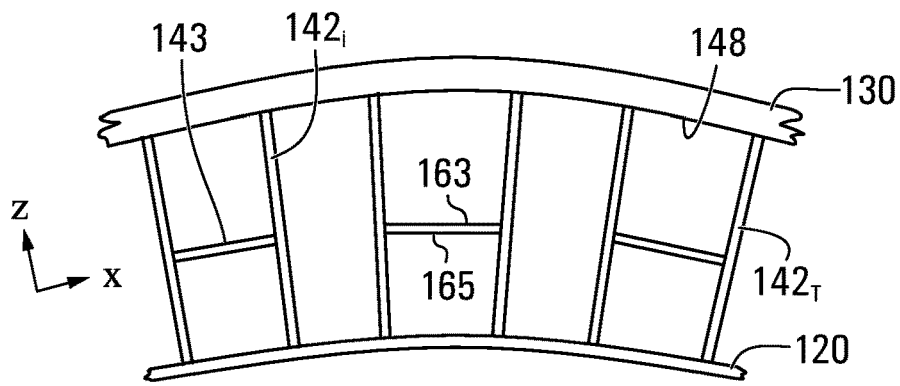
Figure 8:
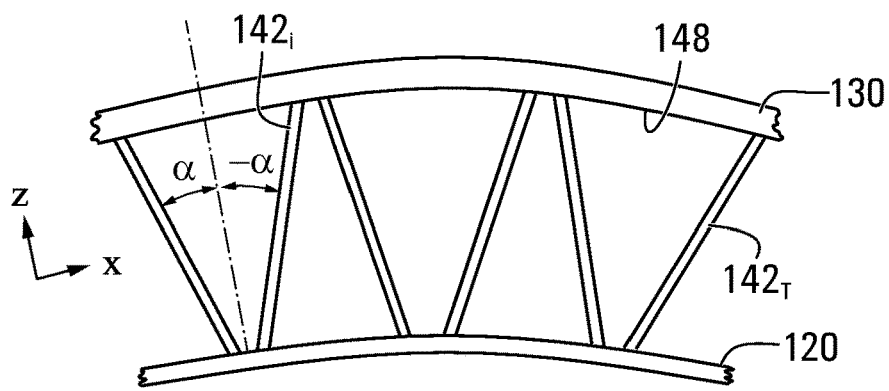
Figure 9:
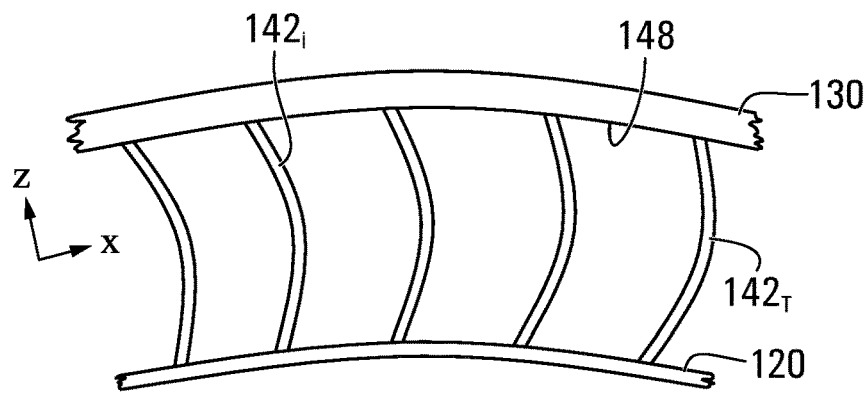

The spokes $142_1$-$142_T$ may be implemented in any other suitable way in other embodiments. For example, FIGS. 6 to 9 show various embodiments of the design of the spokes $142_1$-$142_T$. In the embodiment of FIG. 6, each spoke $142_i$ extends generally along a straight line in the radial direction of the wheel $100_i$. In the embodiment of FIG. 7, each spoke $142_i$ extends generally along a straight line in the radial direction of the wheel $100_i$, a spoke connector 143 being located between every other pair of successive spokes $142_i$ and connecting two successive spokes $142_i$. The spoke connector 143 is substantially perpendicular to the radial direction of the wheel $100_i$ and may be positioned at any distance from the hub 120. along the radial direction of the wheel $100_i$. In some embodiment, the spoke connector 143 extends in the axial direction of the wheel $100_i$ for at least a majority of the width $W_T$ of the non-pneumatic tire 110, which in this case corresponds to the width $W_W$ of the wheel $100_i$. For instance, in some embodiments, the spoke connector 143 may extend in the axial direction of the wheel $100_i$ for more than half, in some cases at least 60%, in some cases at least 80%, and in some cases an entirety of the width $W_T$ of the non-pneumatic tire 110. Moreover, the spoke connector 143 has a thickness $T_{SC}$ measured between a first surface face 163 and a second surface face 165 of the spoke connector 143 that is significantly less than a length and width of the spoke connector 143. In other embodiments, the spoke connector 143 may not be substantially perpendicular to the radial direction of the wheel $100_i$. In other embodiments, there may be a plurality of spoke connectors 143 connecting two spokes $142_i$. In the embodiment of FIG. 8, each spoke $142_i$ extends generally along a straight line at an angle α or −α in the radial direction of the wheel $100_i$ such that two successive spokes $142_i$ do not extend generally along a straight line at the same angle in the radial direction of the wheel $100_i$. In the embodiment of FIG. 9, each spoke $142_i$ extends generally as a curved line along the radial direction of the wheel $100_i$. Other designs may be possible in other embodiments.

The non-pneumatic tire 110 has an inner diameter $D_{TI}$ and an outer diameter $D_{TO}$, which in this case corresponds to the outer diameter $D_W$ of the wheel 100. A sectional height $H_T$ of the non-pneumatic tire 110 is half of a difference between the outer diameter $D_{TO}$ and the inner diameter $D_{TI}$ of the non-pneumatic tire 110. The sectional height HT of the non-pneumatic tire may be significant in relation to the width $W_T$ of the non-pneumatic tire 110. In other words, an aspect ratio AR of the non-pneumatic tire 110 corresponding to the sectional height $H_T$ over the width $W_T$ of the non-pneumatic tire 110 may be relatively high. For instance, in some embodiments, the aspect ratio AR of the non-pneumatic tire 110 may be at least 70%, in some cases at least 90%, in some cases at least 110%, and in some cases even more. Also, the inner diameter $D_{TI}$ of the non-pneumatic tire 110 may be significantly less than the outer diameter $D_{TO}$ of the non-pneumatic tire 110 as this may help for compliance of the wheel $100_i$. For example, in some embodiments, the inner diameter $D_{TI}$ of the non-pneumatic tire 110 may be no more than half of the outer diameter $D_{TO}$ of the non-pneumatic tire 110, in some cases less than half of the outer diameter $D_{TO}$ of the non-pneumatic tire 110, in some cases no more than 40% of the outer diameter $D_{TO}$ of the non-pneumatic tire 110, and in some cases even a smaller fraction of the outer diameter $D_{TO}$ of the non-pneumatic tire 110.

In this embodiment, the non-pneumatic tire 110 therefore comprises different tire materials that make up the tire 110, including the elastomeric materials $M_1$-$M_E$ of the shear band 131 of the annular beam 130 and a spoke material 145 that makes up at least a substantial part (i.e., a substantial part or an entirety) of the spokes $142_1$-$142_T$. The hub 120 comprises a hub material 172 that makes up at least a substantial part of the hub 120. In some embodiments, the hub material 172 may be the same as one of the tire materials, namely one of the elastomeric materials $M_1$-$M_E$ of the shear band 131 of the annular beam 130 and the spoke material 145. In other embodiments, the hub material 172 may be different from any of the tire materials, i.e., different from any of the elastomeric materials $M_1$-$M_E$ of the shear band 131 of the annular beam 130 and the spoke material 145. For instance, in some embodiments, the spoke material 145 and the hub material 172 may be any one of the elastomeric material $M_1$, $M_2$, $M_3$ or any other elastomeric material that may be comprised in the shear band 131 of the annular beam 130.

In this embodiment, any given material of the wheel 100$_i$, such as any given one of the tire materials (i.e., the elastomeric materials $M_1$-$M_E$ of the shear band 131 of the annular beam 130 and the spoke material 145) and/or the hub material 172 may exhibit a non-linear stress vs. strain behavior. For instance, the spoke material 145 may have a secant modulus that decreases with increasing strain of the spoke material 145. A secant modulus herein is defined as a tensile stress divided by a tensile strain for any given point on a tensile stress vs. tensile strain curve measured per ISO 527-1/-2. The spoke material 145 may have a high Young's modulus that is significantly greater than the secant modulus at 100% strain (a.k.a. "the 100% modulus"). Such a non-linear behavior of the spoke material 145 may provide efficient load carrying during normal operation and enable impact loading and large local deflections without generating high stresses. For instance, the spoke material 145 may allow the non-pneumatic tire 110 to operate at a low strain rate (e.g., 2% to 5%) during normal operation yet simultaneously allow large strains (e.g., when the wheel 100$_i$ engages obstacles) without generating high stresses. This in turn may be helpful to minimize vehicle shock loading and enhance durability of the non-pneumatic tire 110.

The non-pneumatic tire 110 may comprise any other arrangement of materials in other embodiments (e.g., different parts of the annular beam 130, different parts of the tread 150, and/or different parts of the spokes 142$_1$-142$_T$ may be made of different materials). For example, in some embodiments, different parts of the tread 150, and/or different parts of the spokes 142$_1$-142$_T$ may be made of different elastomers.

In this embodiment, the hub material 172 constitutes at least part of the hub 120. More particularly, in this embodiment, the hub material 172 constitutes at least a majority (e.g., a majority or an entirety) of the hub 120. In this example of implementation, the hub material 172 makes up an entirety of the hub 120.

In this example of implementation, the hub material 172 is polymeric. More particularly, in this example of implementation, the hub material 172 is elastomeric. For example, in this embodiment, the hub material 172 comprises a polyurethane (PU) elastomer. For instance, in some cases, the PU elastomer may be PET-95A commercially available from COIM, cured with MCDEA.

The hub material 172 may be any other suitable material in other embodiments. For example, in other embodiments, the hub material 172 may comprise a stiffer polyurethane material, such as COIM's PET75D cured with MOCA. In some embodiments, the hub material 172 may not be polymeric. For instance, in some embodiments, the hub material 172 may be metallic (e.g., steel, aluminum, etc.).

The hub 120 may comprise one or more additional materials in addition to the hub material 172 in other embodiments (e.g., different parts of the hub 120 may be made of different materials).

For example, in some embodiments, for the spoked support 140 and the hub 120, various cast polyurethanes of either ether or ester systems may be used when appropriate (e.g. with alternative cure systems such as MOCA). In some examples, a shore hardness in the range of 90 A to 75 D and/or a Young's modulus between 40 MPA to 2000 MPa may be appropriate.

In some embodiments, the spoked support 140 and the hub 120 may comprise different materials. For example, the spoked support 140 may comprise a softer material (e.g., with a Young's modulus between 40 MPA to 100 MPA) and the hub 120 may comprise a harder material (e.g., with modulus between 300 to 2000 MPA).

The tread 150 may comprise an elastomeric material 160. In some examples of implementation, the elastomeric material 160 of the tread 150 may be different from the elastomeric materials $M_1$-$M_E$ of the annular beam 130. For example, in some embodiments, the elastomeric material 160 of the tread 150 may be rubber. In other embodiments, the elastomeric material 160 of the tread 150 may be polyurethane or another elastomer. For instance, in some embodiments, the tread 150 may comprise rubber, cast polyurethane or any other suitable elastomer, and may have a Shore hardness of between 60 A to 85 A, with a Young's modulus between 3 MPa and 20 MPa. The tread 150 may be provided in any suitable way, such as by molding and/or adhesively bonding the elastomeric material 160 of the tread 150 about the annular beam 130.

Figure 10:
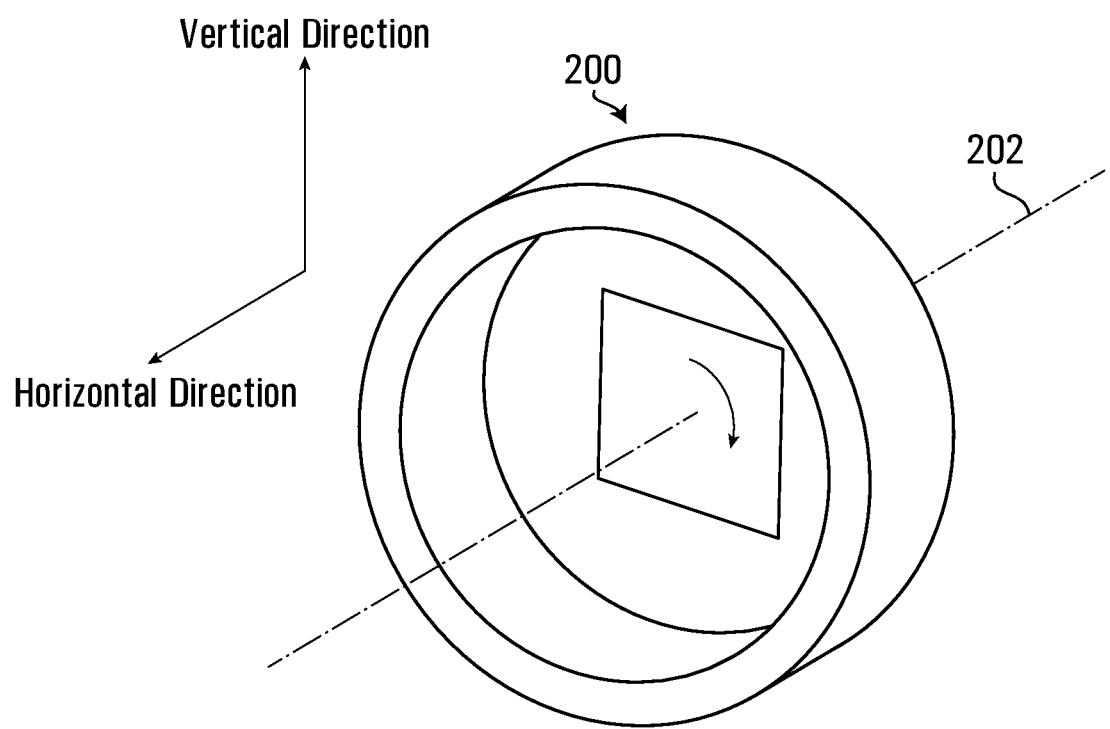
FIG. 10 shows an example of a spin casting process that may be used to make the non-pneumatic tire.

The wheel 100$_i$ may be manufactured in any suitable way. For example, in some embodiments, the non-pneumatic tire 110 and/or the hub 120 may be manufactured via centrifugal casting, a.k.a. spin casting, which involves pouring one or more materials of the wheel 100$_i$ into a mold 200 that rotates about an axis 202 as shown in FIG. 10. The material(s) is(are) distributed within the mold 200 via a centrifugal force generated by the mold's rotation. In some cases, vertical spin casting, in which the mold's axis of rotation 202 is generally vertical, may be used. In other cases, as shown in FIG. 10, horizontal spin casting, in which the mold's axis of rotation 202 is generally horizontal, may be used. In some embodiments, horizontal spin casting may be useful for casting the layers 132$_1$-132$_N$ of the different elastomeric materials $M_1$-$M_E$ of the annular beam 130 in a more controlled manner. The wheel 100 may be manufactured using any other suitable manufacturing processes in other embodiments.

The wheel 100$_i$ may be lightweight. That is, a mass $M_W$ of the wheel 100$_i$ may be relatively small. For example, in some embodiments, a ratio $M_{normalized}$ of the mass $M_W$ of the wheel 100$_i$ in kilograms over the outer diameter $D_W$ of the wheel 100$_i$ normalized by the width $W_W$ of the wheel 100$_i$, $$M_{normalized} = \frac{\left(\frac{M_w}{D_w}\right)}{W_w}$$

may be no more than 0.00035 kg/mm$^2$, in some cases no more than 0.00030 kg/mm$^2$, in some cases no more than 0.00025 kg/mm$^2$, in some cases no more than 0.00020 kg/mm$^2$, in some cases no more than 0.00015 kg/mm$^2$, in some cases no more than 0.00013 kg/mm$^2$, in some cases no more than 0.00011 kg/mm$^2$, and in some cases even less (e.g., no more than 0.0001 kg/mm$^2$).

For instance, in some embodiments, the outer diameter of the wheel 100$_i$ may be 1.5 m, the width of the wheel 100$_i$ may be about 0.5 m, and the mass $M_W$ of the wheel 100 may be about 336 kg. The load capacity of the wheel 100$_i$ may be about 10,000 kg at 15 kph. The wheel $100_i$ may be a replacement for a 20.5"×25" pneumatic tire.

The wheel $100_i$, including the non-pneumatic tire 110 and the hub 120, may thus be designed to enhance its use and performance. Notably, in some embodiments, the structure of the shear band 131 of the annular beam 130 comprising the different elastomeric materials $M_1$-$M_E$ in a laminate configuration may be related to the deflection properties of the annular beam 130 so as to enhance behavior of the contact patch 125 of the wheel $100_i$. When connected to the hub 120 via the spokes $142_1$-$142_T$, the annular beam 130 has a high load to mass ratio, yet keeps the simplicity of an elastomer structure, with no need for inextensible membranes or other composites or reinforcing elements.

Figure 11:
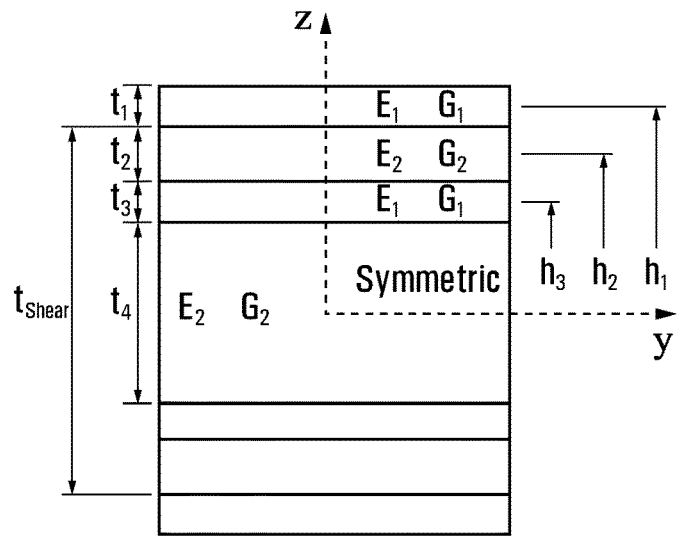
FIG. 11 shows a cross section view of an example of a straight beam that comprises a laminate configuration of elastomer materials.
Figure 12:
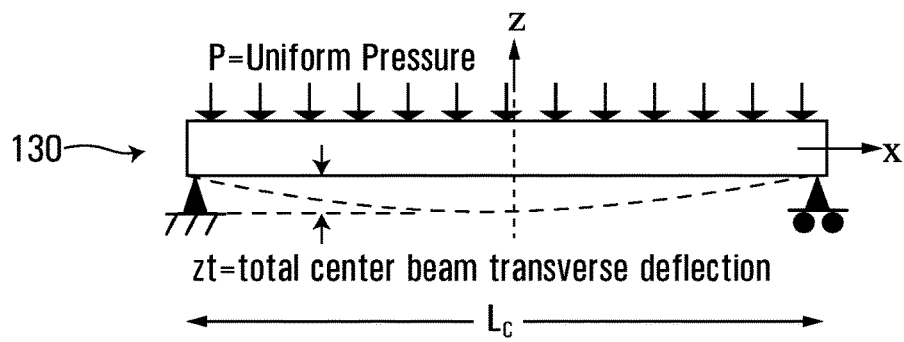
FIG. 12 shows a side elevation view of the straight beam of FIG. 11 when simply supported by two parallel contact surfaces and subjected to a constant pressure P.

For example, in some embodiments, a tire contact pressure may be substantially constant along the length $L_C$ of the contact patch 125. To achieve this, the annular beam 130 having a radius of curvature R may be designed such that it develops a relatively constant pressure along the length $L_C$ of the contact patch 125 when the annular beam 130 is deformed to a flat surface. With reference to FIGS. 11 and 12, this is analogous to designing a straight beam which deforms to a circular arc of radius R when subjected to a constant pressure which is equal to the contact pressure of the annular beam 130 along the length $L_C$ of the contact patch 125. The inventor has found that a homogeneous beam of solid cross section does not behave like this. To create this desired performance, beam bending stiffness and beam shear stiffness can be designed using a laminate of elastomer materials, such that the beam deforms primarily in shear. An example of a method for doing so will now be discussed, using standard nomenclature (e.g. see for example Muvdi, B. B., McNabb, J. W., (1980). Engineering Mechanics of Materials, Macmillan Publishing Co., Inc., New York, N.Y., "Shear and Bending Moment in Beams," pp 23-31, and "Deflections of Beams", pp 266-333, which is hereby incorporated by reference herein).

Without wishing to be bound by any theory, it may be useful to consider certain aspects of the physics of elastomers. The relationship of shear force variation to an applied distributed load on a differential beam element can be expressed as follows:

$$-\frac{dV}{dx} = W \quad (1)$$

Where:
V=transverse shear force
W=Constant distributed load per unit length
x=beam length coordinate The deflection of the differential beam element due to shear deformation alone can be estimated by combining Equation 1 with other known relationships. Adding relations between shear force, shear stress, shear modulus, and cross-sectional area, Equation 2 can be derived:

$$\frac{d^2z}{d^2x} = \frac{W}{GA} \quad (2)$$

Where:
G=beam shear modulus
A=effective beam cross sectional area
z=transverse beam deflection Shear modulus means the shear modulus of elasticity and is calculated according to Equation 10 below. For small deflections, $$\frac{d^2z}{d^2x}$$

is equal to the inverse of the deformed beam radius of curvature. Making this substitution and considering a beam of unit depth, one obtains Equation 3:

$$P = \frac{GA}{R} \quad (3)$$

Where:
G=beam shear modulus
R=deformed beam radius of curvature
A=effective beam cross sectional area, with unit depth
P=Constant distributed pressure, with unit depth According to equation 3, a straight beam of shear modulus G and effective cross sectional area A, such as the straight beam of FIG. 11, will deform into the shape of an arc of radius R when subjected to homogeneous pressure P, provided shear deflection predominates.

Similarly, the annular beam 130 having radius of curvature R, designed such that shear deformation predominates, will develop a homogeneous contact pressure P along the contact patch 125 having the length $L_C$ when deflected against a flat contact surface.

A constant pressure along the contact patch 125 having the length $L_C$ may be a highly desired performance attribute. It may be particularly useful when embodied in the non-pneumatic tire 110 of FIGS. 1 to 3. With further reference to FIG. 3, when a design load is applied at the hub 120, for instance when the wheel $100_i$ supports the weight of the vehicle 10, the annular beam 130 deforms over the contact patch 125 having the length $L_C$ and develops a homogeneous contact pressure over the length $L_C$ of the contact patch 125. The design load is a usual and expected operating load of the non-pneumatic tire 110. Lower ones of the support members $142_1$-$142_T$ in the lower portion 127 of the annular support 140 (between the axis of rotation 180 of the wheel 100 and the contact patch 125 of the wheel 100) are compressed and bend while upper ones of the support members $142_1$-$142_T$ in the upper portion 129 of the annular support 140 (above the axis of rotation 180 of the wheel 100) are tensioned to support the loading, such that the annular beam 130 passes the load to the central hub 120 via tension in annular support 140.

In some embodiments, a homogeneous contact pressure over the length $L_C$ of the contact patch 125 may be achieved through an appropriate laminate configuration of the shear band 131 of the annular beam 130 that comprises elastomers, such as the layers $132_1$-$132_N$ of the different elastomeric materials $M_1$-$M_E$. The material properties of the laminate configuration of the shear band 131 may be designed such that shear deflection can be larger than bending deflection at a center of the contact patch 125.

Analysis of a straight beam may be less cumbersome than the analysis of an annular beam such as the annular beam 130; therefore a first part of an example of a design process may employ a straight beam geometry such as the one shown in FIG. 12 subjected to a constant pressure, in order to design the laminate configuration of the annular beam 130 and the thickness of each one of the layers $132_1$-$132_N$ of the different elastomeric materials $M_1$-$M_E$ in the laminate configuration of the annular beam 130. Final design verification may then include a complete tire model, as will be discussed. Accordingly, in this example, the first step in developing a design process is to calculate the deflection due to bending and the deflection due to shear of a simply supported straight beam subjected to a constant pressure, as shown in FIG. 12. Equation 4 gives the center deflection due to bending; Equation 5 gives the center deflection due to shear; Equation 6 solves for shear deflection divided by bending deflection:

$$z_b = \frac{5}{384} \frac{PL^4}{EI} \quad (4)$$

$$z_s = \frac{1}{4} \frac{PL^2}{GA} \quad (5)$$

$$\frac{z_s}{z_b} = 19.2 \frac{EI}{L^2} \frac{1}{GA} \quad (6)$$

Where:
- $z_b$=beam center deflection due to bending
- $z_s$=beam center deflection due to shear
- L=beam length, which is about equal to the length $L_c$ of the contact patch 125
- E=beam tensile modulus
- I=beam moment of inertia The result of Equation (6) is a dimensionless geometrical term that, for homogeneous materials, is independent of modulus. As $z_s/z_b$ becomes larger, shear deflection predominates. As shear deflection predominates, Equation (3) becomes valid and the desired performance of a constant pressure through the length $L_C$ of the contact patch 125 is achieved.

In usual engineering calculation of transverse deflection of beams, shear deflection may be assumed to be small compared to bending deflection, and shear deflection may be neglected. Consequently, the result of Equation (6) may not be commonly considered. Beam bending stiffness must be relatively high, and beam shear stiffness must be relatively low in order to have $z_s/z_b$ be high enough so that Equation (3) becomes approximately valid.

The next step of the design process in this example is to define the procedure to relate the design of the elastomer laminate structure to the terms of Equation 6. Analytical solutions for the terms are provided below.

FIG. 11 uses a laminate configuration equivalent to the laminate configuration of the shear band 131 of the annular beam 130 as shown in FIGS. 4 and 5. For illustrative purposes, this cross section definition will be used to demonstrate an example of a design methodology. Using the same technique, any general laminate elastomer cross section can be analyzed to determine the quantities for Equation 6.

With reference to FIG. 11 an effective beam shear modulus for this cross-section may be estimated to be used as G in Equation 6. This is calculated using Equation 7:

$$G = G_{eff} = \frac{1}{\frac{v_{f1}}{G_1} + \frac{v_{f2}}{G_2}} \quad (7)$$

$$v_{f1} = \frac{2t_3}{t_{shear}} \quad v_{f2} = \frac{2t_2 + t_4}{t_{shear}}$$

Where Vf1=volume fraction of elastomer 1 across beam radial thickness t shear.
- Vf2=volume fraction of elastomer 2 across beam radial thickness t shear.
- G1=shear modulus of elastomer 1
- G2=shear modulus of elastomer 2

The effective shear modulus calculation is used as the shear modulus G in Equation (5) to calculate $z_s$, the beam center deflection due to shear. For a unit depth assumption the effective beam cross sectional area A for shear deformation calculation equals the beam shear thickness $t_{shear}$. Thus:

$$A = t_{shear} \quad (8)$$

Physically, this can be visualized as the shear deflection across the web of an "I" beam; the outer bands of the high modulus elastomer act like the flanges of the "I" beam. These flanges add moment of inertia for high bending stiffness, and are very high in shear modulus as well. This forces the shear strain to occur across the thickness $t_{shear}$. This shear strain is the value used to calculate the transverse beam deflection due to shear.

For homogeneous, isotropic materials, the shear modulus and tensile modulus are related by Poisson's ratio, as given in Equation (10):

$$G = \frac{E}{2(1 + \upsilon)} \quad (10)$$

Where:
- $\upsilon$=Poisson's ratio
- E=Young's tensile modulus
- G=shear modulus For elastomeric materials like cast polyurethane, Poisson's ratio is generally close to 0.45. Therefore, given Young's tensile modulus, shear modulus can be calculated, and vice versa.

The "G" and the "A" for Equation 6 are now defined. The product of the beam moment of inertia "I" and Young's modulus "E" can be estimated as follows, using variables shown in FIG. 11:

$$EI = 2 * (EI_{band1} + EI_{band2} + EI_{band3}) + EI_{band4} \quad (10)$$

$$= 2 * \left( E_1 \left( t_1 h_1^2 + \frac{1}{12} t_1^3 \right) + E_2 \left( t_2 h_2^2 + \frac{1}{12} t_2^3 \right) + E_1 \left( t_3 h_3^2 + \frac{1}{12} t_3^3 \right) \right) +$$

$$E_2 \frac{1}{2} t_4^3$$

Equations (7) and (10) explicitly calculate G and EI for the laminate elastomer beam of FIG. 11. However, using engineering principles of area moment of inertia and the rule of mixtures in series, any laminate beam can be calculated in a similar manner. For instance, in some cases, for any number of different elastomers of the annular beam: EI may be determined as $\Sigma E_i I_i$ which is a sum of products of the modulus of elasticity $E_i$ and the moment of inertia $I_i$ of each of the layers of the annular beam; and G may be determined as $1/\Sigma(v_{fi}/G_i)$ where $v_{fi}$ is the volume fraction and $G_i$ is the shear modulus of each of the layers of the annular beam.

With EI known from Equation (10) and GA known from Equations (7) and (8), the only unknown in Equation (6) is the length $L_C$ of the contact patch 125. This is a design parameter which relates to a rated load of the non-pneumatic tire being designed. The length $L_C$ of the contact patch 125 times a width of the contact patch 125 times a contact pressure P along the contact patch 125 will approximately equal the design load of the tire.

Figure 13:
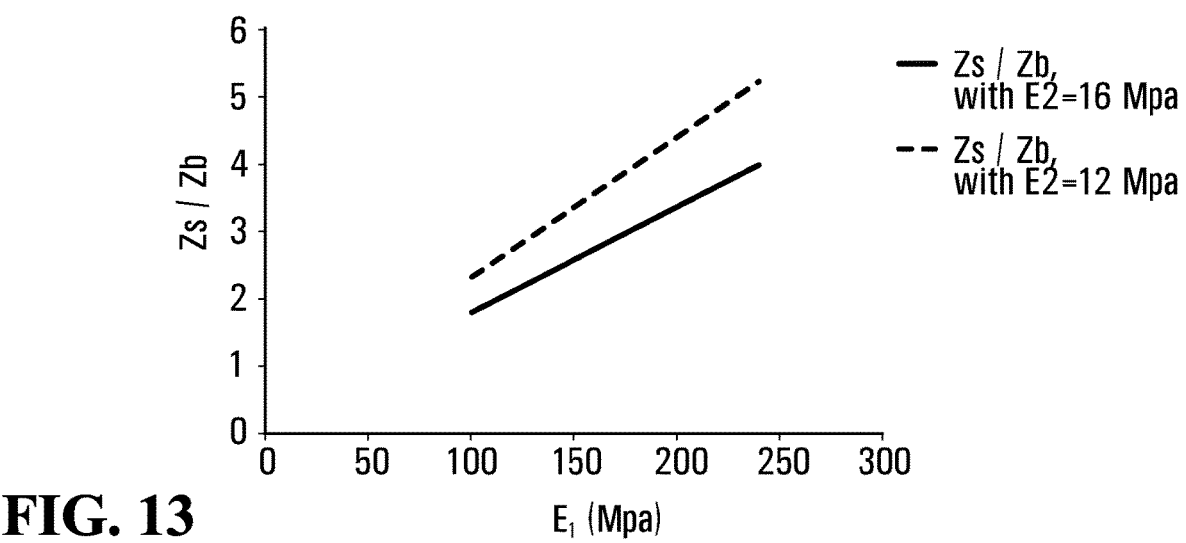
FIG. 13 shows a graph showing an example of a relationship between a ratio of beam deflections due to shear and due to bending and a modulus of elasticity of an elastomeric material.

When the straight beam parameters E, I, G, and A are known and related to the design parameters of the laminate structure of the straight beam of FIG. 11, the simply supported beam with boundary conditions shown in FIG. 12 can be evaluated using Equations (4) and (5). An example of the results of such calculations is shown in FIG. 13. Using the laminate configuration of FIG. 11, with geometric values of t1, t2, t3, and t4 that are commensurate with a total tire thickness in the radial (z) direction of 100 mm, FIG. 13 shows that the ratio $z_s/z_b$ increases as the difference between E1 and E2 increases.

Additional work by the inventor has shown that a homogeneous contact pressure distribution can be obtained along the length $L_C$ of the contact patch 125 of the non-pneumatic tire 110 provided $z_s/z_b$ is sufficiently high. For example, in some embodiments, when $z_s/z_b$ is at least about 1.2, in some cases at least about 1.5, in some cases at least 2, in some cases at least 3, and in some cases even more (e.g., 4 or more), the contact pressure will be substantially uniform.

Figure 14:
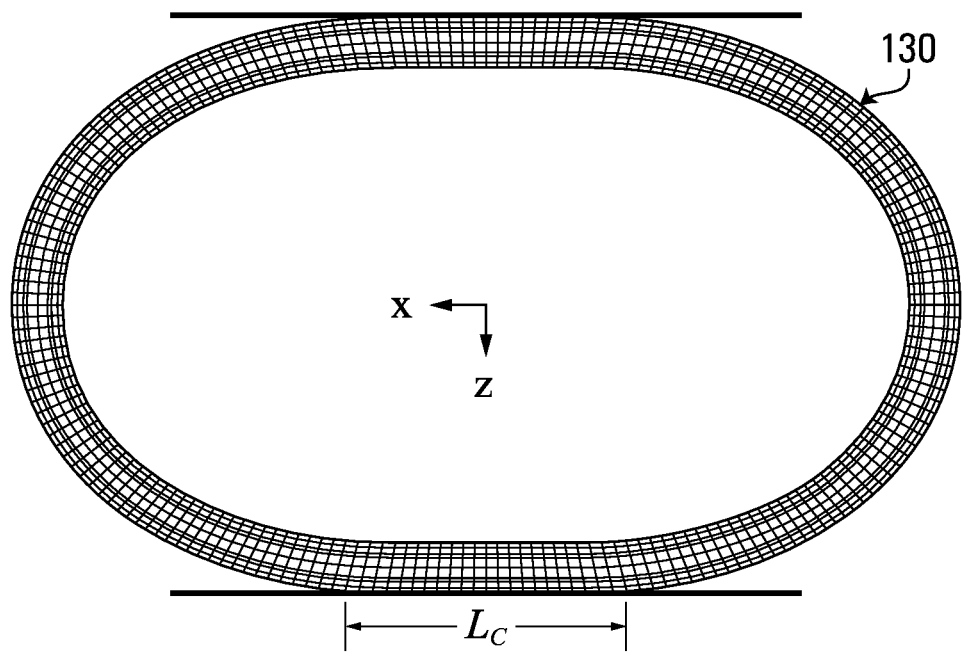
FIG. 14 shows a finite-element model of an embodiment of the annular beam loaded between two parallel contact surfaces.

FIG. 14 shows an example of a finite-element model of an embodiment of the annular beam 130 comprising the shear band 131 loaded between two parallel surfaces and producing the contact patch 125 having the length $L_C$.

Figure 15:
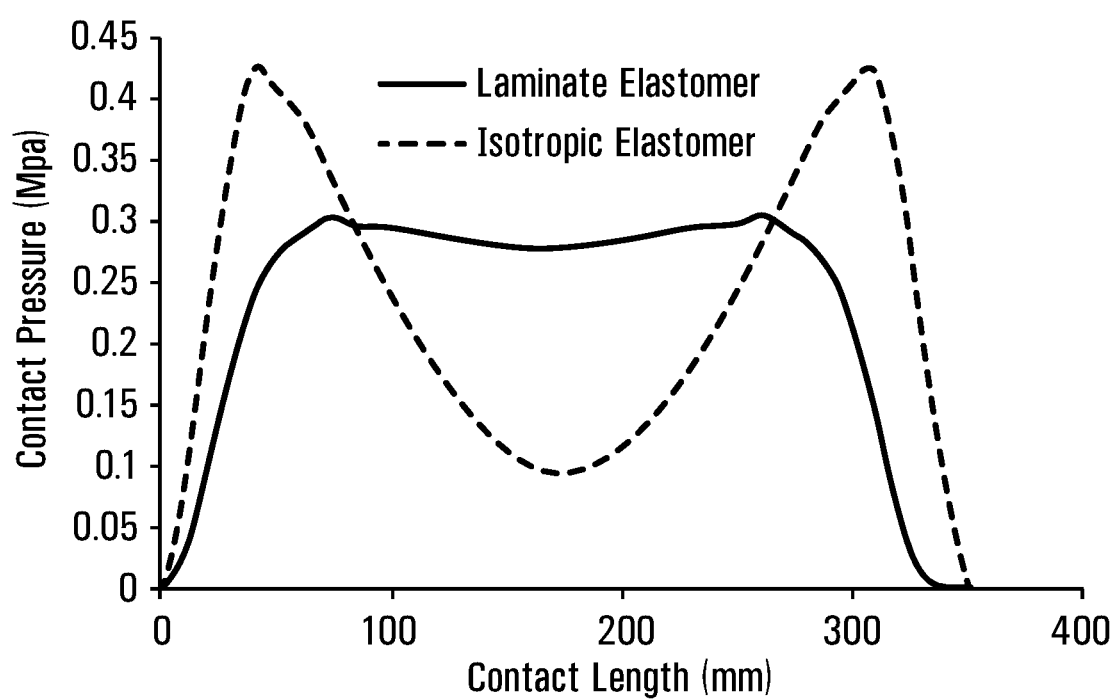
FIG. 15 shows analytical solutions of a contact pressure distribution along a contact length of a contact patch of an embodiment of the annular beam comprising the laminate configuration and an embodiment of an annular beam made of an isotropic elastomer.

FIG. 15 shows the contact pressure through the length $L_C$ of the contact patch 125 for the laminate configuration or for an isotropic configuration of the shear band 131 of the annular beam 130 of FIG. 14. With an isotropic elastomer cross section of E=80 MPa, the contact pressure is very non-uniform. The contact pressure peaks occur at the entrance and exit of the contact patch 125, and the contact pressure is at a minimum in the center of the contact patch 125. With a laminate configuration like that of FIG. 11, with E1=205 MPa and E2=16 MPa, the pressure distribution is substantially uniform.

Figure 16:
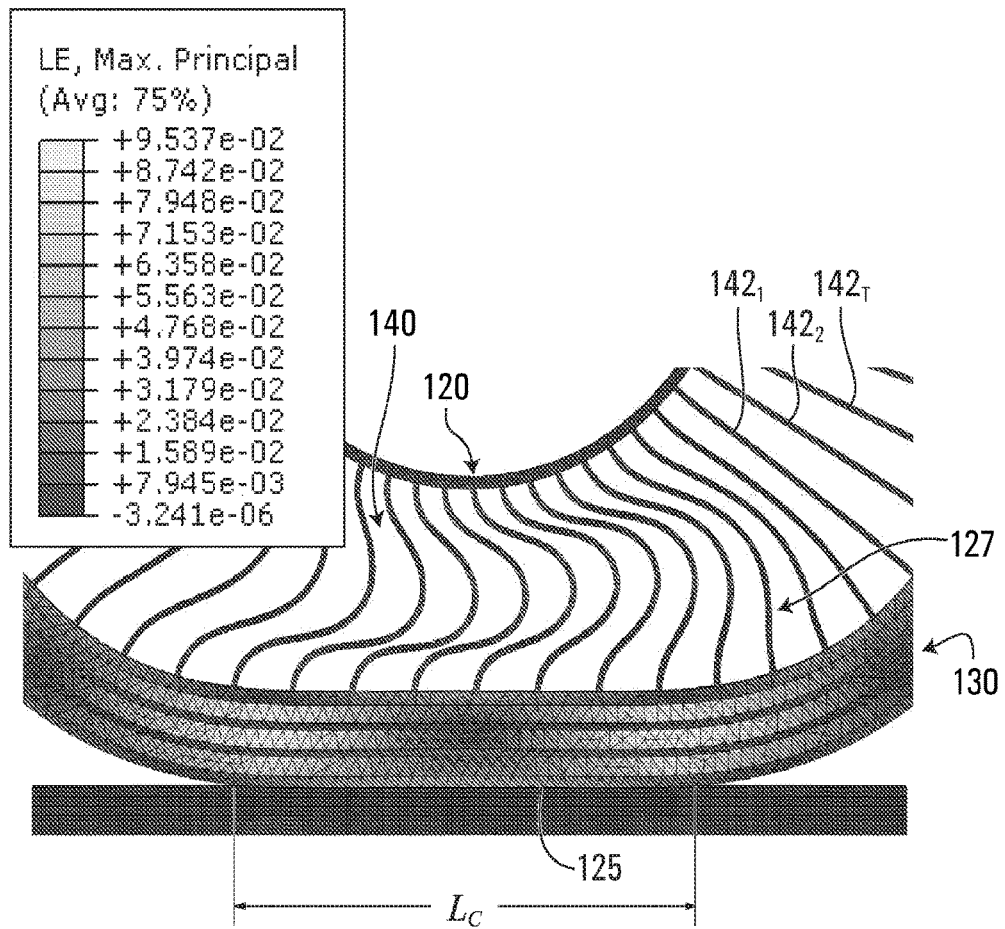
FIG. 16 shows a finite-element model of an embodiment of the non-pneumatic tire comprising the annular beam of FIG. 14 and subjected to a vertical load on a rigid contact surface.
Figure 17:
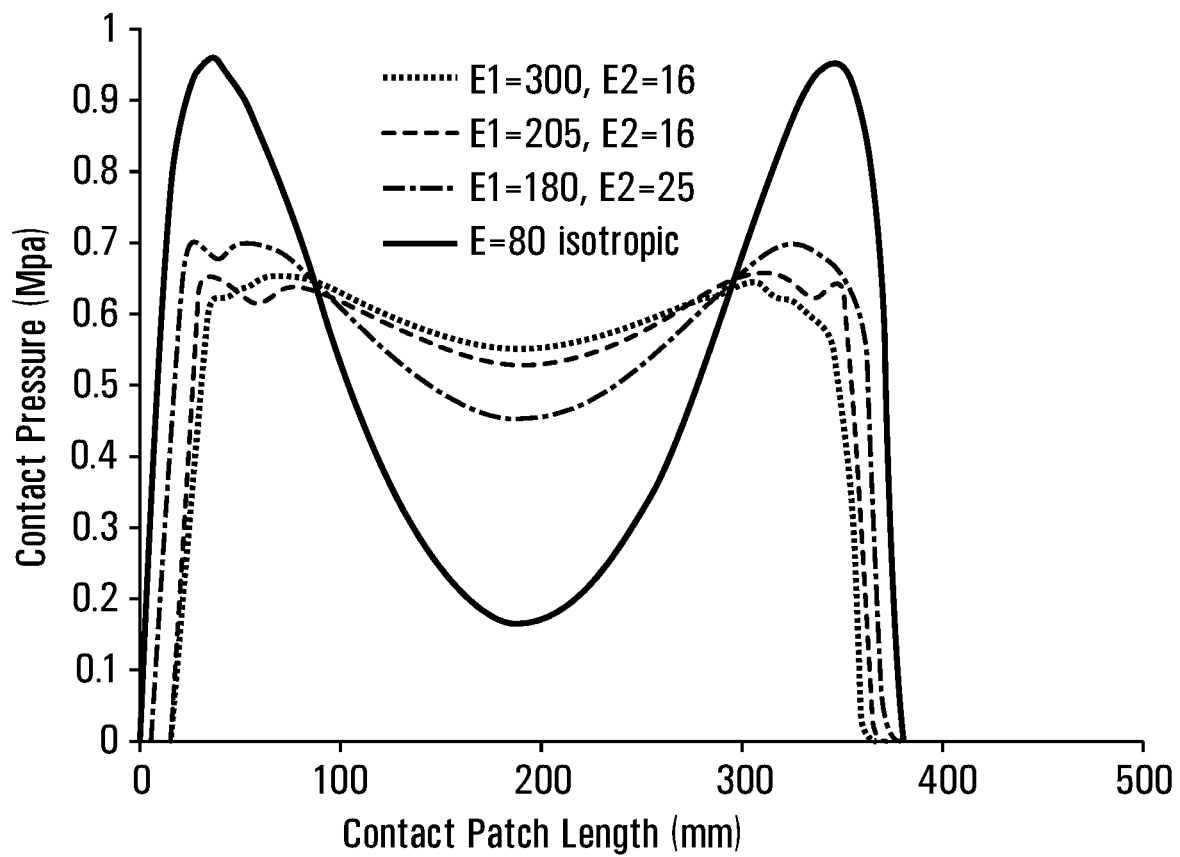
FIG. 17 shows analytical solutions of a contact pressure distribution along the contact length of the contact patch of an embodiment of the annular beam of the non-pneumatic tire of FIG. 16 comprising different laminate configurations and an embodiment of an annular beam comprising an isotropic elastomer.

The annular beam 130 comprising the shear band 131 of FIG. 14 can be connected to the hub 120 via support members $142_1$-$142_T$ (i.e., spokes) to create the non-pneumatic tire 110. An example of a corresponding finite-element model of an embodiment of the non-pneumatic tire 110 comprising the annular beam 130 including the shear band 131 of FIG. 14, the spokes $142_1$-$142_T$ and the hub 120 is shown in FIG. 16. In this example, the non-pneumatic tire 110 has dimensions 20.5×25—a size used in the construction industry, with the outer diameter $D_{TO}$ of around 1.5 meters. The contact patch 125 has the length $L_C$=370 nm when loaded to a design load of 11 metric tons. FIG. 17 provides the principle strains in the annular beam 130 comprising the shear band 131 of FIG. 16. Maximum elastomer strains are about 0.09 (9%) which is well within the allowable cyclic strain capabilities of thermoset polyurethanes.

FIG. 17 further shows the contact pressure profile through the length $L_C$ of the contact patch 125 of the non-pneumatic tire of FIG. 16 for various laminate configurations and for an isotropic configuration of the shear band 131 of the annular beam 130. As with the beam analysis of FIGS. 14 and 15, the results show that the isotropic case gives pressure peaks at the entrance and exit of the contact patch 125. In this case, pressure peaks of almost 1 MPa (=10 bar=150 psi) occur. When laminate configurations are used, the pressure profile becomes more uniform. As the difference between E1 and E2 increases, the pressure becomes progressively more uniform.

In some embodiments, certain elastomeric materials may exhibit favorable non-linear stress vs. strain characteristics. For example, in some embodiments, a choice may be made of a material having a very non-linear material behavior, for which the secant modulus decreases with increasing strain. The "modulus" is the initial slope of the stress vs. strain curve, often termed "Young's modulus" or "tensile modulus." In some embodiments, materials can be used that have a high Young's modulus that is much greater than their secant modulus at 100% strain, which is often termed "the 100% modulus." The "secant modulus" is the tensile stress divided by the tensile strain for any given point on the tensile stress vs. tensile strain curve measured per ISO 527-1/-2. This nonlinear behavior provides efficient load carrying during normal operation, yet enables impact loading and large local deflections without generating high stresses.

Figure 18:
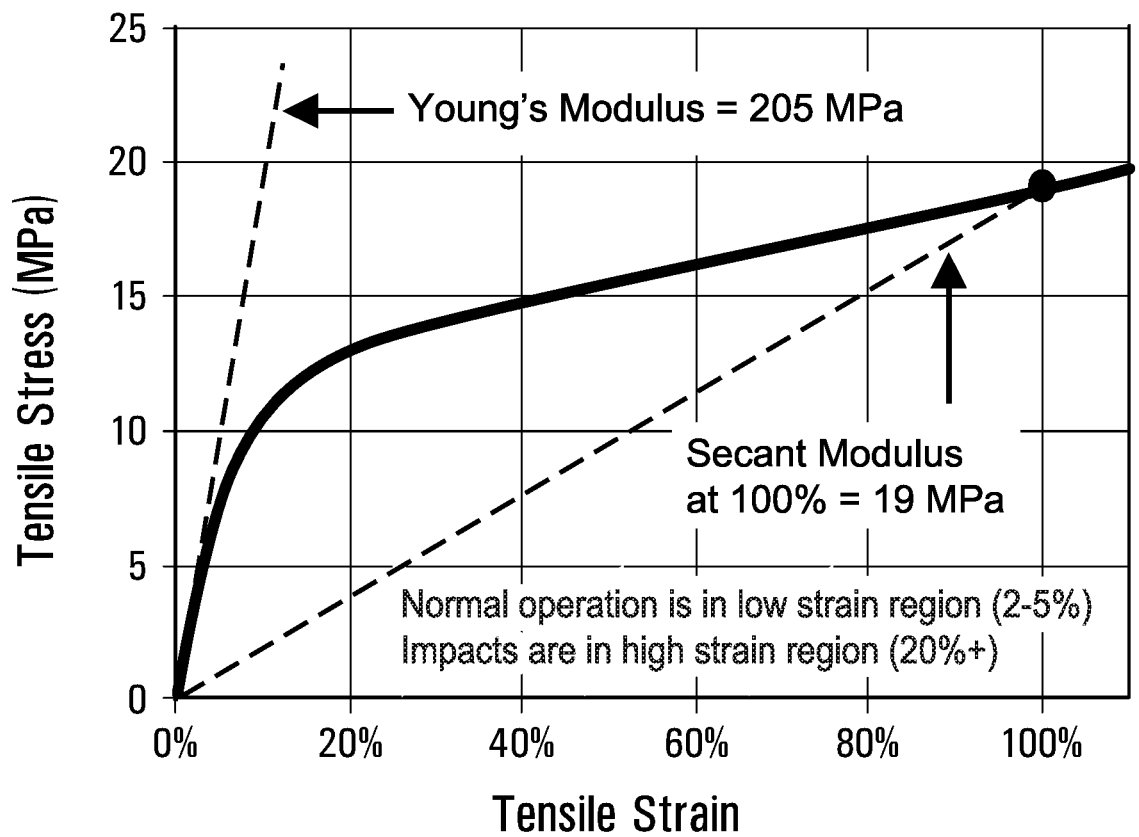
FIG. 18 shows an example of a thermoplastic polyurethane exhibiting non-linear stress vs. strain characteristics.

Some thermoset and thermoplastic polyurethanes have this material behavior. An example of such a favorable material is shown in FIG. 18. The measured stress vs. strain curve of COIM's PET-95A, with curative MCDEA, has a Young's modulus of 205 MPa. However, the secant modulus at 100% strain is only 19 MPa. This may be a favorable attribute in some embodiments; when following the design principles earlier disclosed, the tire normally operates in the 5 to 9% strain region. In this region, the material is moderately stiff and the slope of the stress vs. strain curve is fairly constant. However, if local deformation occurs due to road hazards or impacts, the material is capable of large strains, without generation of high stresses. This minimizes vehicle shock loading, and enhances tire durability.

Elastomers are often used in areas of high imposed strains. As such, in some application, testing protocol typically focuses on the performance at high strains, such as 100%, 200%, or more. Mechanical designs that carry load in tension and bending typically do not use one homogeneous elastomer—they employ reinforcements as well. Some embodiments of the annular beam 130 opens this new design space by leveraging this material non-linearity with a favorable mechanical design.

The wheel $100_t$, including its annular beam 130, may be implemented in various other ways in other embodiments.

For example, in some embodiments, the annular beam 130 may be designed based on principles discussed in U.S. Patent Application Publication 2014/0367007, which is hereby incorporated by reference herein, in order to achieve the homogeneous contact pressure along the length $L_C$ of the contact patch 125 of the wheel $100_t$ with the ground. The use of multiple elastomers can be combined with a more complex geometry such that the resulting performance is superior to that which could be obtained by using either technology by itself.

Figure 19:
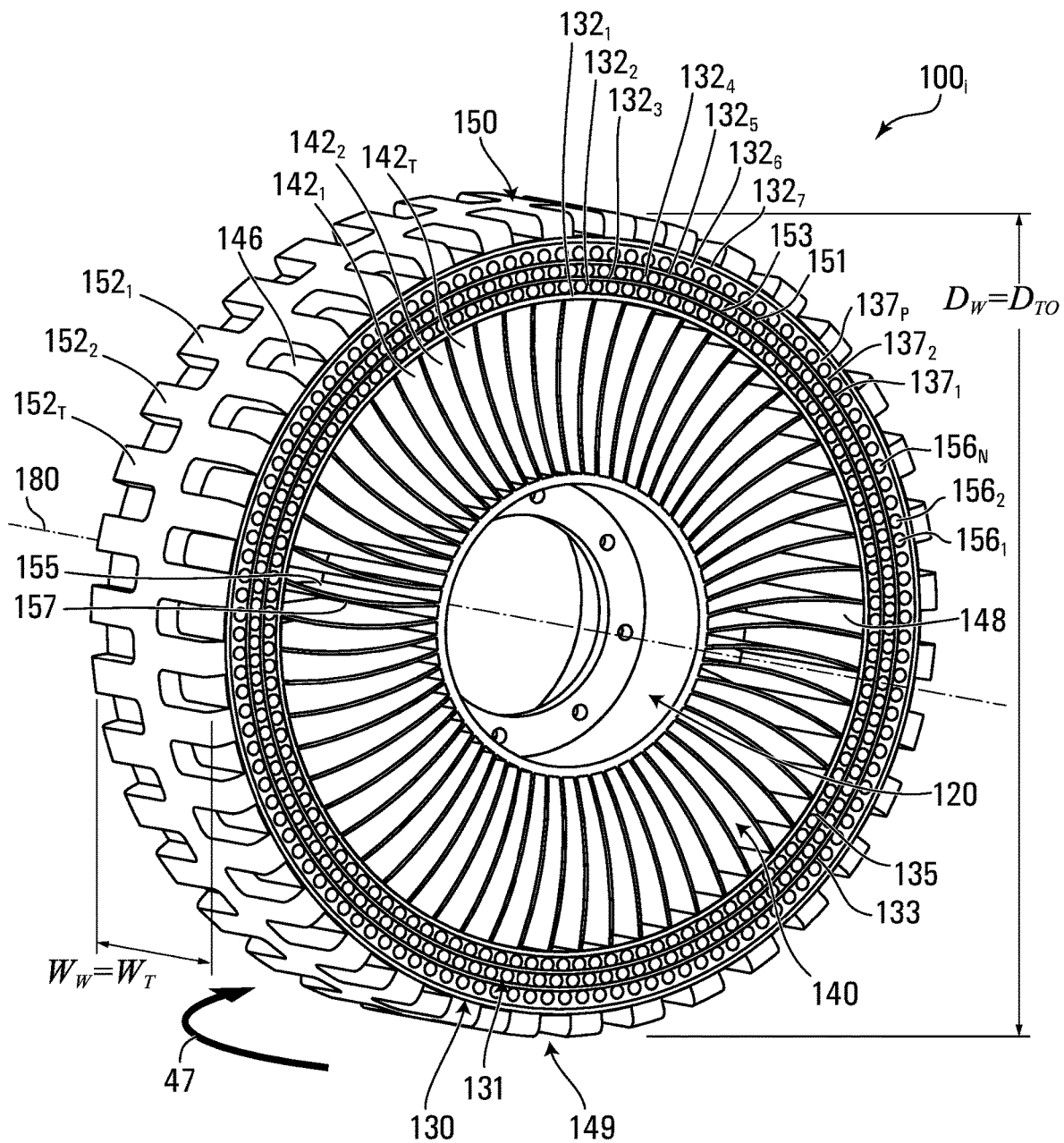
FIG. 19 shows a perspective view of the wheel comprising the non-pneumatic tire in accordance with another embodiment of the invention.
Figure 20:
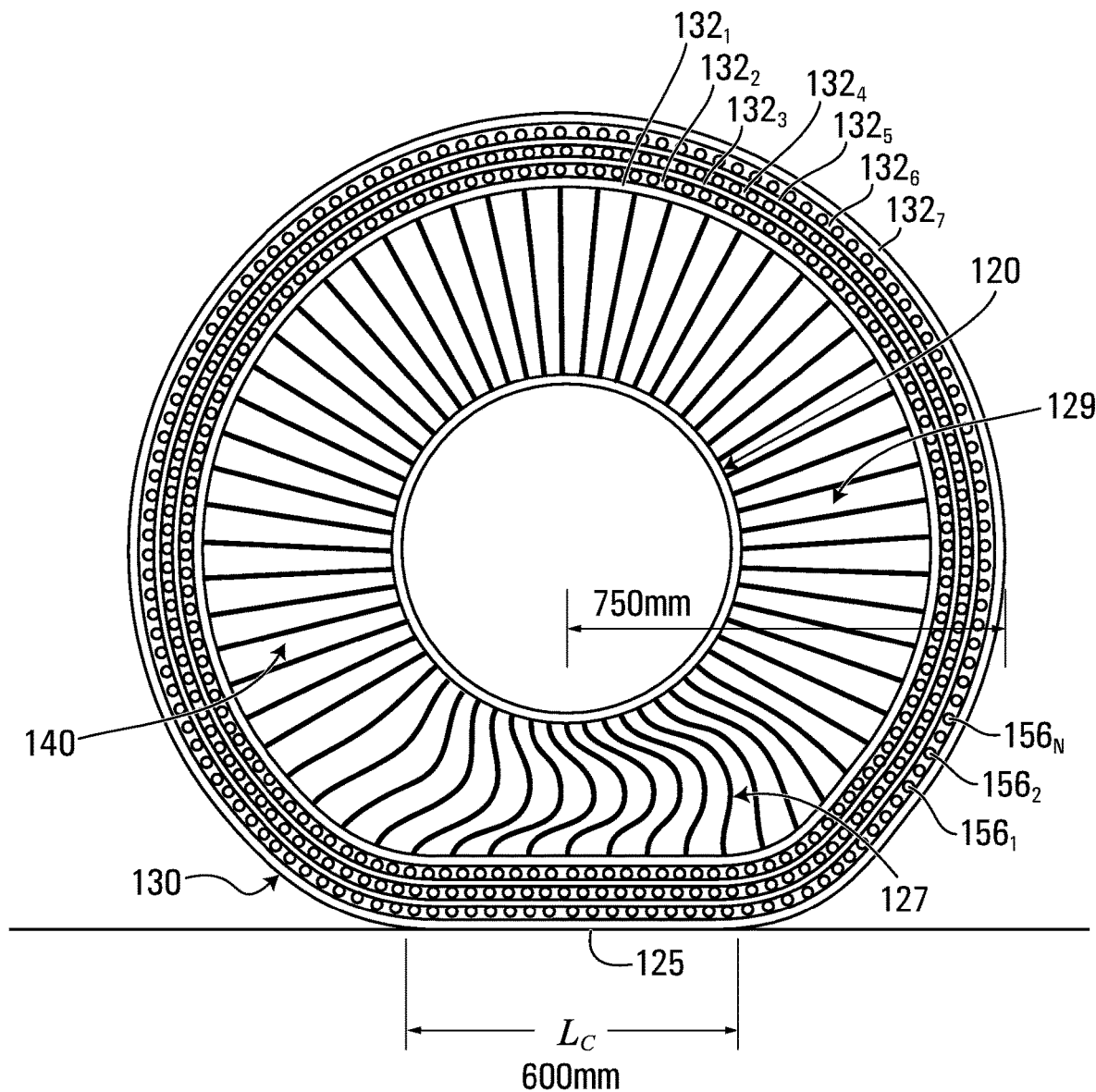
FIG. 20 shows a finite-element model of the non-pneumatic tire of FIG. 19 subjected to a vertical load on a deformable contact surface.

In this embodiment, and with reference to FIGS. 19 and 20, the shear band 130 comprises an outer rim 133, an inner rim 135, and a plurality of openings $156_1$-$156_N$ between the outer rim 133 and the inner rim 133 in addition to including the layers $132_1$-$132_N$ of the different elastomeric materials $M_1$-$M_E$. The shear band 131 comprises a plurality of interconnecting members $137_1$-$137_P$ that extend between the outer rim 133 and the inner rim 135 and are disposed between respective ones of the openings $156_1$-$156_N$. The interconnecting members $137_1$-$137_P$ may be referred to as "webs" such that the shear band 131 may be viewed as being "web-like" or "webbing". In this embodiment, the shear band 131 comprises intermediate rims 151, 153 between the outer rim 133 and the inner rim 135 such that the openings $156_1$-$156_N$ and the interconnecting members $137_1$-$137_P$ are arranged into three circumferential rows between adjacent ones of the rims 133, 151, 153, 135. The shear band 131, including the openings $156_1$-$156_N$ and the interconnecting members $137_1$-$137_P$, may be arranged in any other suitable way in other embodiments.

The openings $156_1$-$156_N$ of the shear band 131 help the shear band 131 to deflect predominantly by shearing at the contact patch 125 under the loading on the wheel $100_i$. In this embodiment, the openings $156_1$-$156_N$ extend from the inboard lateral side 147 to the outboard lateral side 149 of the non-pneumatic tire 110. That is, the openings $156_1$-$156_N$ extend laterally though the shear band 131 in the axial direction of the wheel $100_i$. The openings $156_1$-$156_N$ may extend laterally without reaching the inboard lateral side 147 and/or the outboard lateral side 149 of the non-pneumatic tire 110 in other embodiments. The openings $156_1$-$156_N$ may have any suitable shape. In this example, a cross-section of each of the openings $156_1$-$156_N$ is circular. The cross-section of each of the openings $156_1$-$156_N$ may be shaped differently in other examples (e.g., polygonal, partly curved and partly straight, etc.). In some cases, different ones of the openings $156_1$-$156_N$ may have different shapes. In some cases, the cross-section of each of the openings $156_1$-$156_N$ may vary in the axial direction of the wheel $100_i$. For instance, in some embodiments, the openings $156_1$-$156_N$ may be tapered in the axial direction of the wheel $100_i$ such that their cross-section decreases inwardly axially (e.g., to help minimize debris accumulation within the openings $156_1$-$156_N$).

Therefore, in this embodiment, the shear band 131 of the annular beam 130 comprises both (1) the openings $156_1$-$156_N$ and (2) the layers $132_1$-$132_N$ of the different elastomeric materials $M_1$-$M_E$. By using both geometry and material effects, further optimization is possible. For example, while thermoset polyurethanes and thermoplastic polyurethanes have a wide processing and optimization window (e.g., modulus values between 10 MPa and 300 MPa being readily assessable), in some embodiments, the physics may demand a very large bending stiffness and a very low shear stiffness, if a long contact patch of low, homogenous pressure is desired, and combining the openings $156_1$-$156_N$ and the layers $132_1$-$132_N$ of the different elastomeric materials $M_1$-$M_E$ may allow to achieve desired effects.

FIG. 20 shows a finite-element model of an embodiment of the non-pneumatic tire 110 having these combined technologies. In this non-limiting example, a webbing geometry and laminate configuration have been designed to give about a 0.1 MPa contact pressure, through a length of 600 mm. The length $L_C$ of the contact patch 125 of the embodiment of FIG. 20 represents a large percentage of the radius of the tire, which is 750 mm.

Figure 21:
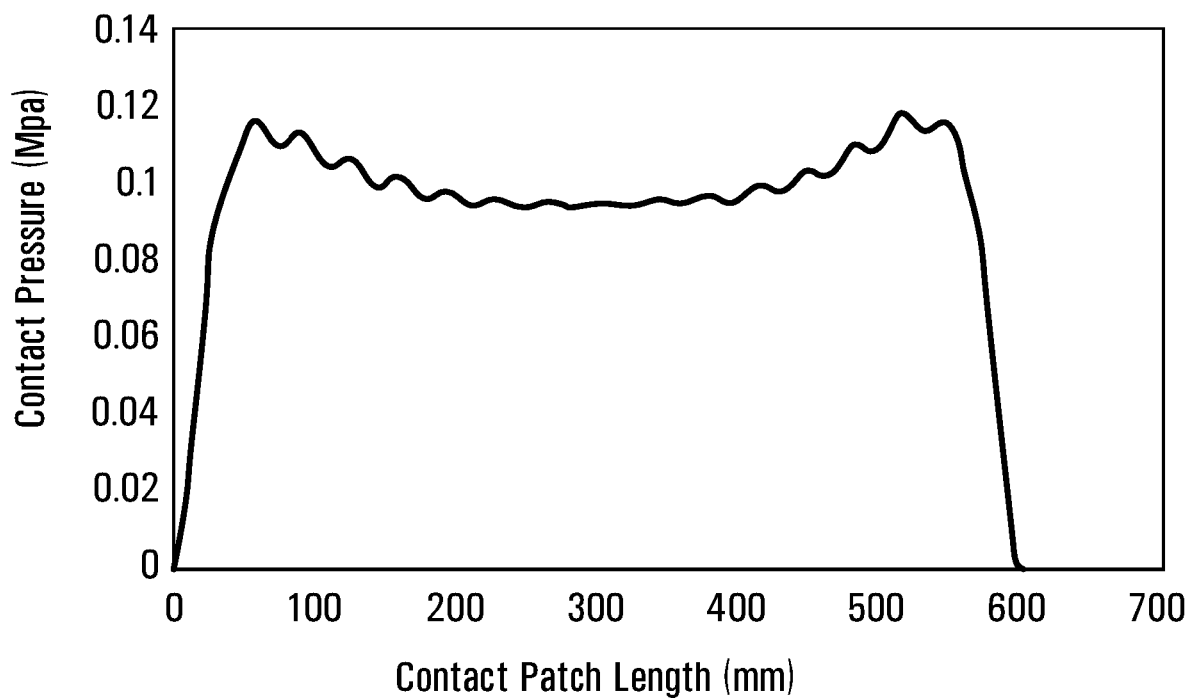
FIG. 21 shows analytical solutions of a contact pressure distribution along a contact length of the contact patch of the non-pneumatic tire of FIG. 20.

The contact pressure profile through the length $L_C$ of the contact patch 125 of the non-pneumatic tire of FIG. 20 is shown in FIG. 21. In this non-limiting example, the inventor has used a deformable ground, corresponding to the stiffness of clay. This more fully represents the actual usage of such a tire in an off-road condition. The pressure distribution is fairly uniform, equal to about 0.105+/−0.05 MPa (=1.05 bar=16 psi). This level of contact pressure may be particularly appropriate in an agricultural tire usage.

In some embodiments, the wheel $100_i$, including its non-pneumatic tire 110, may enable a design space that may not be readily possible with pneumatic tires. Notably, in some embodiments, the wheel $100_i$ may be designed to be relatively narrow yet have a high load carrying capacity and a long contact patch.

For example, in some embodiments, the wheel $100_i$ may be such that (1) a ratio $W_T/D_{TO}$ of the width $W_T$ of the non-pneumatic tire 110 over the outer diameter $D_{TO}$ of the non-pneumatic tire 110 is no more than 0.1 and (2) a ratio $D_H/D_{TO}$ of the diameter of the hub 120 over the outer diameter $D_{TO}$ of the non-pneumatic tire 110 is no more than 0.5, namely:

$W_T/D_{TO} \leq 0.15$ (15%)

$D_H/D_{TO} \leq 0.50$ (50%)

For instance, in some embodiments, the ratio $W_T/D_{TO}$ of the width $W_T$ of the non-pneumatic tire 110 over the outer diameter $D_{TO}$ of the non-pneumatic tire 110 may be less than 0.1, in some cases no more than 0.08, in some cases no more than 0.06, and in some cases no more than 0.04, and/or the ratio $D_H/D_{TO}$ of the diameter of the hub 120 over the outer diameter $D_{TO}$ of the non-pneumatic tire 110 may be less than 0.5, in some cases no more than 0.4, and in some cases no more than 0.3.

As another example, in some embodiments, the wheel $100_i$ may be such that a ratio $L_c/R_{TO}$ of the length $L_c$ of the contact patch 125 of the non-pneumatic tire 110 at the design load over an outer radius $R_{TO}$ of the non-pneumatic tire 110 (i.e., half of the outer diameter $D_{TO}$ of the non-pneumatic tire 110) is at least 0.4, in some cases at least 0.5, in some cases at least 0.6, in some cases at least 0.7, in some cases at least 0.8, in some cases at least 0.9, and in some cases even more (e.g., 1 or more).

Figure 22:
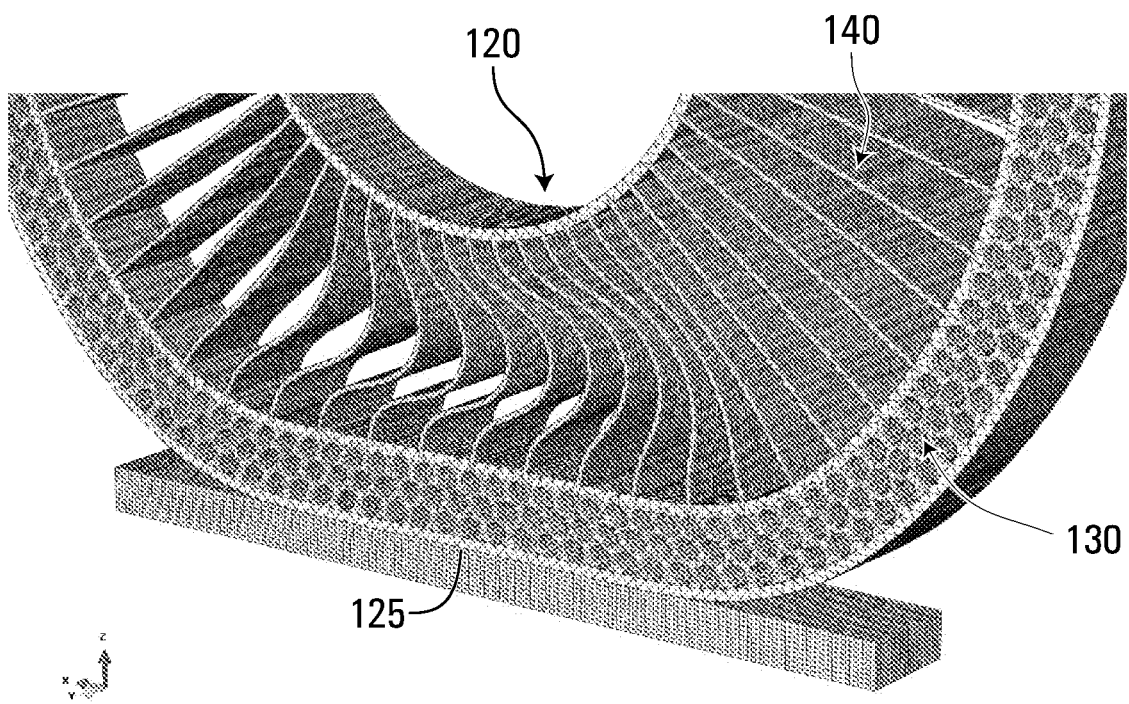
FIG. 22 shows a finite-element model of the non-pneumatic tire of FIG. 20.

FIG. 22 shows an example of a finite-element model of the non-pneumatic tire 110 of FIG. 20, having the width $W_T$=120 mm, and the outer diameter $D_{TO}$=1500 mm. For inflated tires, a small width and a large outer diameter result in the need for a relatively large mounting rim. The equilibrium curve mechanics of both radial and bias tires are such that a width of 120 mm would result in a maximum sidewall height of only about 120 mm. This limits the contact patch length as well as the ability of the tire to absorb energy when traversing uneven terrain.

In this example, the length $L_C$ of the contact patch 125 may approach or be larger than the outer radius of the non-pneumatic tire 110 and there is a larger distance between the tire outer diameter $D_{TO}$ and the hub 120. As a result, in this example, the load carrying capacity of the non-pneumatic tire 110 can be quite large. With $W_T$=120 mm and $D_{TO}$=1500 mm, the design load can be about 750 kg, with sustained speeds of 30 kph or more permitted, with a ground contact pressure at the contact patch 125 of about 1 bar.

Figure 23:
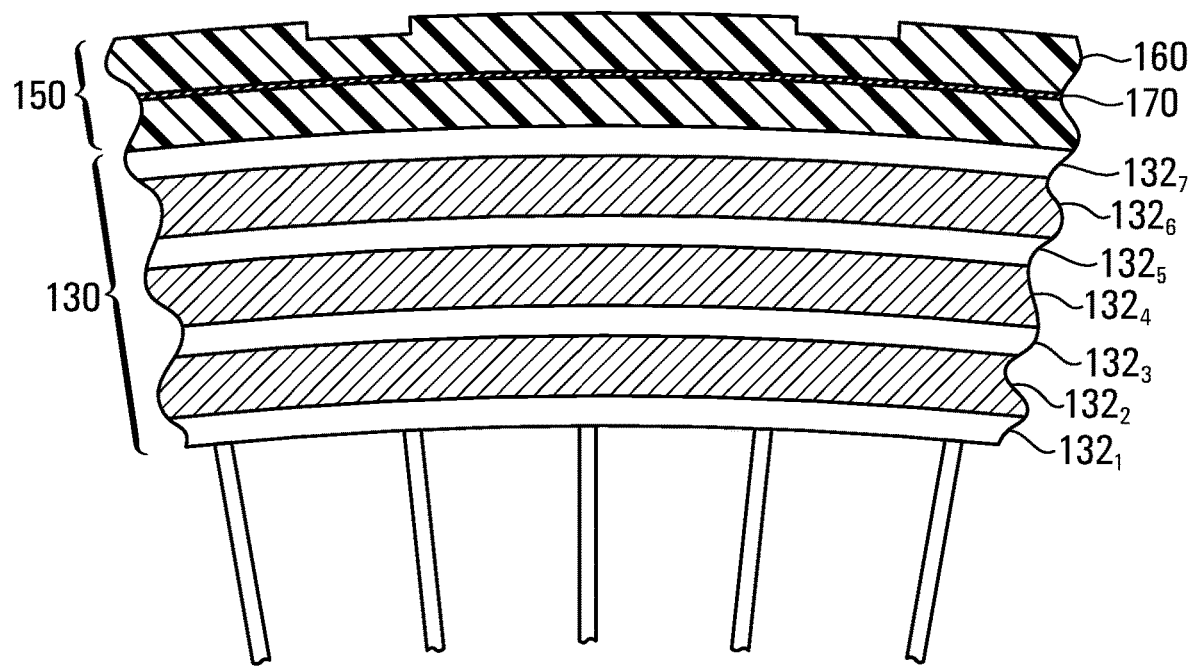
FIG. 23 shows a partial cross-sectional view of the non-pneumatic tire that comprises a tread comprising a reinforcing layer in accordance with another embodiment of the invention.

The non-pneumatic tire 110 may comprise other components in other embodiments. For example, in some embodiments, as shown in FIG. 23, the tread 150 may comprise a reinforcing layer 170 disposed within its elastomeric material 160 (e.g., rubber) and extending in the circumferential direction of the wheel $100_i$.

For example, in some embodiments, the reinforcing layer 170 may comprise a layer of reinforcing cables that are adjacent to one another and extend generally in the circumferential direction of the wheel $100_i$. For instance, in some cases, each of the reinforcing cables may be a cord including a plurality of strands (e.g., textile fibers or metallic wires). In other cases, each of the reinforcing cables may be another type of cable and may be made of any material suitably flexible along the cable's longitudinal axis (e.g., fibers or wires of metal, plastic or composite material).

As another example, in some embodiments, the reinforcing layer 170 may comprise a layer of reinforcing fabric. The reinforcing fabric comprises thin pliable material made usually by weaving, felting, knitting, interlacing, or otherwise crossing natural or synthetic elongated fabric elements, such as fibers, filaments, strands and/or others, such that some elongated fabric elements extend transversally to the circumferential direction of the wheel $100_i$ to have a reinforcing effect in that direction. For instance, in some cases, the reinforcing fabric may comprise a ply of reinforcing woven fibers (e.g., nylon fibers or other synthetic fibers).

In some cases, the reinforcing layer 170 of the tread 150 may be substantially inextensible in the circumferential direction of the wheel $100_i$. The non-pneumatic tire 110 may thus be such that its annular beam 130 is free of any substantially inextensible reinforcing layer running in its circumferential direction while its tread 150 includes the reinforcing layer 170 that may be substantially inextensible in its circumferential direction.

The tread 150 including the reinforcing layer 170 may be provided in any suitable way. For example, in some embodiments, the tread 150 may be manufactured separately from the annular beam 130 and then affixed to the annular beam 130. For instance, in some embodiments, the tread 150 may be manufactured by arranging one or more layers of its elastomeric material 160 (e.g., rubber) and its reinforcing layer 170 into a mold and molding them (e.g., compression molding them) into an annular configuration of the tread 150. The tread 150 may then be affixed to the annular beam 130 in any suitable way. For instance, in some embodiments, the tread 150 may be expanded to fit about the annular beam 130 and then contracted to become attached to the annular beam 130. In some examples, this may be achieved by a coefficient of thermal expansion of the reinforcing layer 170 of the tread 150 allowing the reinforcing layer 170 to expand for stretching the elastomeric material 160 of the tread 150 in order to fit the tread 150 around the annular beam 130 and then to contract for attaching the tread 150 to the annular beam 130. The tread 150 may be affixed to the annular beam 130 in any other suitable manner in other examples (e.g., including by using an adhesive to adhesively bond the tread 150 and the annular beam 130).

While in embodiments considered above the wheel $100_i$ is part of the construction vehicle 10, a wheel constructed according to principles discussed herein may be used as part of other vehicles or other machines in other embodiments.

Figure 24:
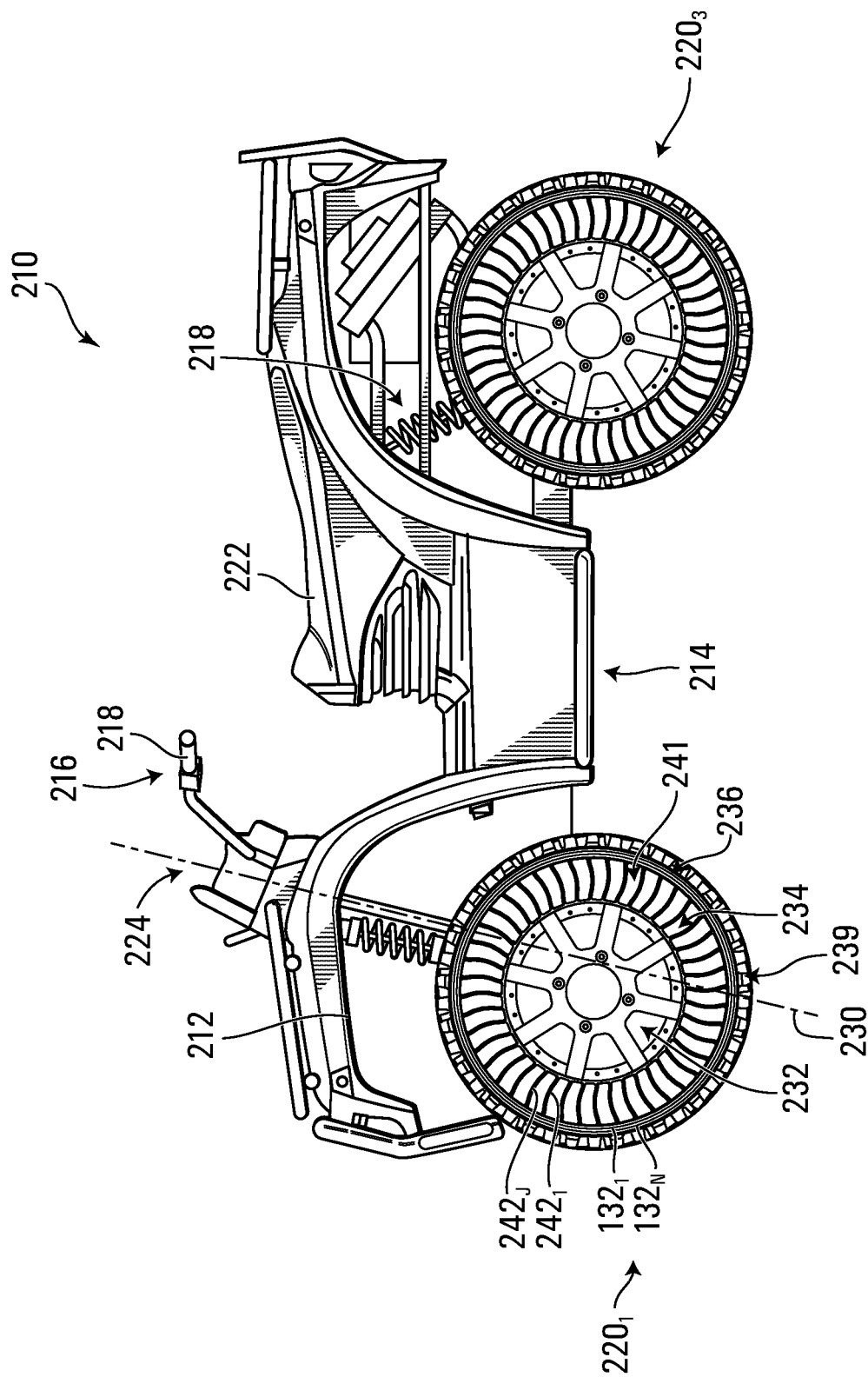
FIGS. 24 and 25 show an example of another vehicle comprising wheels that comprise non-pneumatic tires in accordance with another embodiment of the invention.
Figure 25:
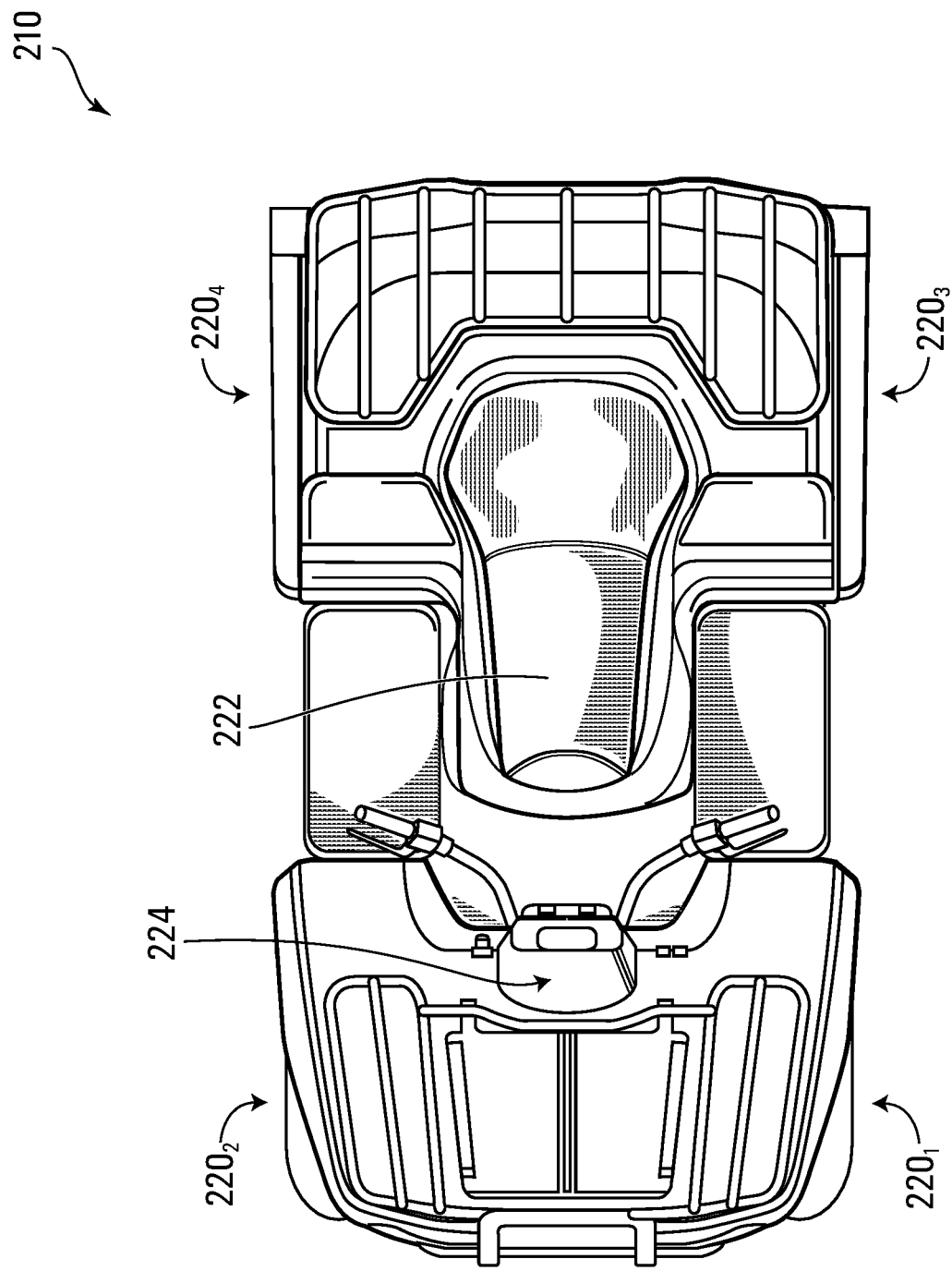

For example, with additional reference to FIGS. 24 and 25, in some embodiments, an all-terrain vehicle (ATV) 210 may comprise wheels $220_1$-$220_4$ constructed according to principles discussed herein in respect of the wheel $100_i$. The ATV 210 is a small open vehicle designed to travel off-road on a variety of terrains, including roadless rugged terrain, for recreational, utility and/or other purposes. In this example, the ATV 210 comprises a frame 212, a powertrain 214, a steering system 216, a suspension 218, the wheels $220_1$-$220_4$, a seat 222, and a user interface 224, which enable a user of the ATV 210 to ride the ATV 210 on the ground.

The steering system 216 is configured to enable the user to steer the ATV 210 on the ground. To that end, the steering system 216 comprises a steering device 228 that is operable by the user to direct the ATV 210 along a desired course on the ground. In this embodiment, the steering device 228 comprises handlebars. The steering device 228 may comprise a steering wheel or any other steering component that can be operated by the user to steer the ATV 210 in other embodiments. The steering system 216 responds to the user interacting with the steering device 228 by turning respective ones of the wheels $220_1$-$220_4$ to change their orientation relative to the frame 212 of the ATV 210 in order to cause the ATV 210 to move in a desired direction. In this example, front ones of the wheels $220_1$-$220_4$ are turnable in response to input of the user at the steering device 228 to change their orientation relative to the frame 212 of the ATV 210 in order to steer the ATV 210 on the ground. More particularly, in this example, each of the front ones of the wheels $220_1$-$220_4$ is pivotable about a steering axis 230 of the ATV 210 in response to input of the user at the steering device 228 in order to steer the ATV 210 on the ground. Rear ones of the wheels $220_1$-$220_4$ are not turned relative to the frame 212 of the ATV 210 by the steering system 216.

The suspension 218 is connected between the frame 212 and the wheels $220_1$-$220_4$ to allow relative motion between the frame 122 and the wheels $220_1$-$220_4$ as the ATV 210 travels on the ground. For example, the suspension 218 enhances handling of the ATV 210 on the ground by absorbing shocks and helping to maintain traction between the wheels $20_1$-$20_4$ and the ground. The suspension 218 may comprise an arrangement of springs and dampers. A spring may be a coil spring, a leaf spring, a gas spring (e.g., an air spring), or any other elastic object used to store mechanical energy. A damper (also sometimes referred to as a "shock absorber") may be a fluidic damper (e.g., a pneumatic damper, a hydraulic damper, etc.), a magnetic damper, or any other object which absorbs or dissipates kinetic energy to decrease oscillations. In some cases, a single device may itself constitute both a spring and a damper (e.g., a hydropneumatic, hydrolastic, or hydragas suspension device).

In this embodiment, the seat 222 is a straddle seat and the ATV 210 is usable by a single person such that the seat 222 accommodates only that person driving the ATV 210. In other embodiments, the seat 222 may be another type of seat, and/or the ATV 210 may be usable by two individuals, namely one person driving the ATV 210 and a passenger, such that the seat 222 may accommodate both of these individuals (e.g., behind one another or side-by-side) or the ATV 210 may comprise an additional seat for the passenger. For example, in other embodiments, the ATV 210 may be a side-by-side ATV, sometimes referred to as a "utility terrain vehicle" or "utility task vehicle" (UTV).

The wheels $220_1$-$220_4$ engage the ground to provide traction to the ATV 210. More particularly, in this example, the front ones of the wheels $220_1$-$220_4$ provide front traction to the ATV 10 while the rear ones of the wheels $220_1$-$220_4$ provide rear traction to the ATV 10.

Figure 26:
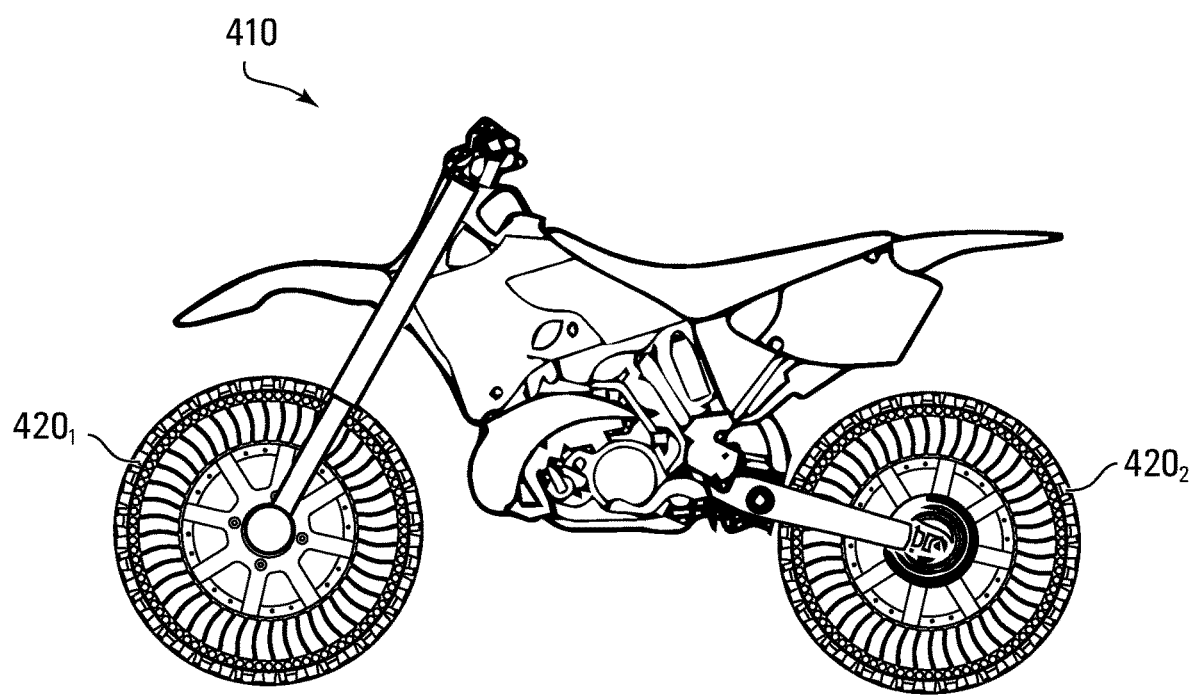
FIG. 26 shows an example of another vehicle comprising wheels that comprises non-pneumatic tires in accordance with another embodiment of the invention.

Each wheel $220_i$ of the ATV 210 may be constructed according to principles described herein in respect of the wheel $100_i$, notably by comprising a non-pneumatic tire 234 and a hub 232 that may be constructed according to principles described herein in respect of the non-pneumatic tire 110 and the hub 120. The non-pneumatic tire 234 comprises an annular beam 236 and an annular support 241 that may be constructed according principles described herein in respect of the annular beam 130 and the annular support 140. For instance, the annular beam 236 comprises a shear band 239 comprising a plurality of layers $232_1$-$232_N$ of different elastomeric materials $M_1$-$M_E$ and the annular support 241 comprises spokes $242_1$-$242_J$ that may be constructed according to principles described herein in respect of the shear band 131 and the spokes $142_1$-$142_T$. As another example, in some embodiments, with additional reference to FIG. 26, a motorcycle 410 may comprise a front wheel 4201 and a rear wheel 4202 constructed according to principles discussed herein in respect of the wheel $100_i$.

As another example, in some embodiments, a wheel constructed according to principles discussed herein in respect of the wheel $100_i$ may be used as part of an agricultural vehicle (e.g., a tractor, a harvester, etc.), a material-handling vehicle, a forestry vehicle, or a military vehicle.

As another example, in some embodiments, a wheel constructed according to principles discussed herein in respect of the wheel $100_i$ may be used as part of a road vehicle such as an automobile or a truck.

As another example, in some embodiments, a wheel constructed according to principles discussed herein in respect of the wheel $100_i$ may be used as part of a lawnmower (e.g., a riding lawnmower or a walk-behind lawnmower).

Although embodiments considered above pertain to a non-pneumatic tire, in other embodiments, other annular devices, such as, for instance, tracks for vehicles and/or conveyor belts, may comprise an annular beam constructed according to principles discussed herein in respect of the annular beam 130.

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

Any feature of any embodiment discussed herein may be combined with any feature of any other embodiment discussed herein in some examples of implementation.

In case of any discrepancy, inconsistency, or other difference between terms used herein and terms used in any document incorporated by reference herein, meanings of the terms used herein are to prevail and be used.

Although various embodiments and examples have been presented, this was for the purpose of describing, but not limiting, the invention. Various modifications and enhancements will become apparent to those of ordinary skill in the art and are within the scope of the invention, which is defined by the appended claims.

The invention claimed is:

1. A wheel component comprising:
a non-pneumatic tire comprising:
    a tread;
    an annular beam disposed radially inwardly of the tread, configured to deflect more by shearing than by bending at a contact patch of the non-pneumatic tire, and comprising a plurality of layers of different elastomeric materials; and
    a tension-based annular support disposed radially inwardly of the annular beam and resiliently deformable such that, when the non-pneumatic tire is loaded, an upper portion of the tension-based annular support above an axis of rotation of the non-pneumatic tire is in tension; and
    a hub disposed radially inwardly of the tension-based annular support;
wherein: a ratio of the transverse deflection of the annular beam due to shear over a transverse deflection of the annular beam due to shear over a transverse deflection of the annular beam due to bending at a center of a design contact length is at least 1.2 when an outermost radial extent of the annular beam is loaded against a substantially flat surface over the design contact length; and the non-pneumatic tire is unreinforced between the tread and the tension-based annular support.

2. The wheel component of claim 1, wherein a modulus of elasticity of a first one of the different elastomeric materials is different from a modulus of elasticity of a second one of the different elastomeric materials.

3. The wheel component of claim 2, wherein a ratio of the modulus of elasticity of the first one of the different elastomeric materials over the modulus of elasticity of the second one of the different elastomeric materials is at least 2.

4. The wheel component of claim 3, wherein the ratio of the modulus of elasticity of the first one of the different elastomeric materials over the modulus of elasticity of the second one of the different elastomeric materials is at least 3.

5. The wheel component of claim 2, wherein the modulus of elasticity of the first one of the different elastomeric materials is at least 150 MPa and the modulus of elasticity of the second one of the different elastomeric materials is no more than 50 MPa.

6. The wheel component of claim 5, wherein the modulus of elasticity of the first one of the different elastomeric materials is at least 200 MPa and the modulus of elasticity of the second one of the different elastomeric materials is no more than 30 MPa.

7. The wheel component of claim 1, wherein: a first one of the layers of the annular beam is made of a first one of the different elastomeric materials;
and a second one of the layers of the annular beam is disposed radially inwardly of the first one of the layers of the annular beam and is made of a second one of the different elastomeric materials that is less stiff than the first one of the different elastomeric materials.

8. The wheel component of claim 1, wherein: a first one of the layers of the annular beam is made of a first one of the different elastomeric materials; a second one of the layers of the annular beam is made of a second one of the different elastomeric materials; a third one of the layers of the annular beam is made of the first one of the different elastomeric materials; and the second one of the layers of the annular beam is disposed radially between the first one of the layers of the annular beam and the third one of the layers of the annular beam.

9. The wheel component of claim 8, wherein the first one of the different elastomeric materials is stiffer than the second one of the different elastomeric materials.

10. The wheel component of claim 1, wherein a radially-outermost one of the layers of the annular beam and a radially-innermost one of the layers of the annular beam are made of a first one of the different elastomeric materials; and an intermediate one of the layers of the annular beam is disposed radially between the radially-outermost one of the layers of the annular beam and the radially-innermost one of the layers of the annular beam and is made of a second one of the different elastomeric materials.

11. The wheel component of claim 10, wherein the first one of the different elastomeric materials is stiffer than the second one of the different elastomeric materials.

12. The wheel component of claim 1, wherein the layers of the annular beam are arranged such that the different elastomeric materials alternate in a radial direction of the non-pneumatic tire.

13. The wheel component of claim 1, wherein the ratio of the transverse deflection of the annular beam due to shear over the transverse deflection of the annular beam due to bending at the center of the contact patch is at least 2.

14. The wheel component of claim 1, wherein a contact pressure at the contact patch of the non-pneumatic tire is substantially constant over the contact patch.

15. The wheel component of claim 1, wherein the ratio of the transverse deflection of the annular beam due to shear over the transverse deflection of the annular beam due to bending at the center of the design contact length is determined as:

$$\frac{z_s}{z_b} = 19.2 \frac{EI}{L^2} \frac{1}{GA}$$

where:
- $z_s$ is the transverse deflection of the annular beam due to shear;
- $z_b$ is the transverse deflection of the annular beam due to bending;
- L is the design contact length;
- A is a cross-sectional area of the annular beam;
- EI is an effective product of a modulus of elasticity E and a moment of inertia I of the annular beam that is determined as $\Sigma E_i I_i$ which is a sum of products of a modulus of elasticity $E_i$ and a moment of inertia $I_i$ of each of the layers of the annular beam; and
- G is an effective shear modulus of the annular beam that is determined as $1/\Sigma(v_{fi}/G_i)$ where $v_{fi}$ is a volume fraction and $G_i$ is a shear modulus of each of the layers of the annular beam.

16. The wheel component of claim 1, wherein a contact pressure produced by the annular beam against the substantially flat surface is substantially constant over the design contact length.

17. The wheel component of claim 1, comprising a plurality of spokes disposed radially inwardly of the annular beam and resiliently deformable such that, when the non-pneumatic tire is loaded, upper ones of the spokes above an axis of rotation of the non-pneumatic tire are in tension.

18. A wheel component comprising:
a non-pneumatic tire comprising:
a tread;
an annular beam disposed radially inwardly of the tread, configured to deflect more by shearing than by bending at a contact patch of the non-pneumatic tire, and comprising a plurality of layers of different elastomeric materials; and
a plurality of spokes disposed radially inwardly of the annular beam and resiliently deformable such that, when the non-pneumatic tire is loaded, upper ones of the spokes above an axis of rotation of the non-pneumatic tire are in tension; and
a hub disposed radially inwardly of the spokes;
wherein the non-pneumatic tire is unreinforced between the tread and the tension-based annular support.

19. The wheel component of claim 18, wherein: a ratio of a transverse deflection of the annular beam due to shear over a transverse deflection of the annular beam due to bending at a center of a design contact length is at least 1.2 when an outermost radial extent of the annular beam is loaded against a substantially flat surface over the design contact length.

20. The wheel component of claim 18, wherein a ratio of a modulus of elasticity of a first one of the different elastomeric materials over a modulus of elasticity of a second one of the different elastomeric materials is at least 2.

21. The wheel component of claim 18, wherein a ratio of a modulus of elasticity of a first one of the different elastomeric materials over a modulus of elasticity of a second one of the different elastomeric materials is at least 3.

22. The wheel component of claim 18, wherein a modulus of elasticity of a first one of the different elastomeric materials is at least 150 MPa and a modulus of elasticity of a second one of the different elastomeric materials is no more than 50 MPa.

23. The wheel component of claim 18, wherein: a first one of the layers of the annular beam is made of a first one of the different elastomeric materials; and a second one of the layers of the annular beam is disposed radially inwardly of the first one of the layers of the annular beam and is made of a second one of the different elastomeric materials that is less stiff than the first one of the different elastomeric materials.

24. The wheel component of claim 18, wherein: a first one of the layers of the annular beam is made of a first one of the different elastomeric materials; a second one of the layers of the annular beam is made of a second one of the different elastomeric materials; a third one of the layers of the annular beam is made of the first one of the different elastomeric materials; and the second one of the layers of the annular beam is disposed radially between the first one of the layers of the annular beam and the third one of the layers of the annular beam.

25. The wheel component of claim 18, wherein the layers of the annular beam are arranged such that the different elastomeric materials alternate in a radial direction of the non-pneumatic tire.

\* \* \* \* \*